US011321545B2

(12) United States Patent
Spolzino et al.

(10) Patent No.: US 11,321,545 B2
(45) Date of Patent: May 3, 2022

(54) BARCODE SCANNER SYSTEM WITH ANIMATED FEEDBACK

(71) Applicant: Datalogic IP Tech S.r.l., Calderara di Reno (IT)

(72) Inventors: Simone Spolzino, Granarolo dell 'Emilia (IT); Luca Perugini, Bologna (IT); Federico Canini, Zola Predosa (IT)

(73) Assignee: Datalogic IP Tech, S.R.L., Calderera di Reno (IT)

( * ) Notice: Subject to any disclaimer, the term of this patent is extended or adjusted under 35 U.S.C. 154(b) by 2 days.

(21) Appl. No.: 16/917,400

(22) Filed: Jun. 30, 2020

(65) Prior Publication Data
US 2021/0406487 A1 Dec. 30, 2021

(51) Int. Cl.
*G06K 7/10* (2006.01)
*G06K 9/22* (2006.01)
*G06K 7/00* (2006.01)
*G06K 19/06* (2006.01)
*G06K 7/14* (2006.01)

(52) U.S. Cl.
CPC ....... *G06K 7/0065* (2013.01); *G06K 7/10386* (2013.01); *G06K 7/1456* (2013.01); *G06K 19/06093* (2013.01)

(58) Field of Classification Search
CPC .......... G06K 7/1413; G06K 19/06028; G06K 7/10722; G06K 19/06037; G06K 7/10821; G06K 7/1417; G06K 7/1465; G06K 7/0065; G06K 7/10286; G06K 7/1456; G06K 19/06093

USPC .......... 235/462.01, 472.01–472.03
See application file for complete search history.

(56) References Cited

U.S. PATENT DOCUMENTS

| 6,899,273 | B2 | 5/2005 | Hussey et al. | |
|---|---|---|---|---|
| 7,090,137 | B1 * | 8/2006 | Bennett | H04M 1/6075 235/472.01 |
| 8,985,461 | B2 | 3/2015 | Gelay et al. | |
| 9,785,814 | B1 * | 10/2017 | Todeschini | G06K 7/1426 |
| 9,918,395 | B1 * | 3/2018 | Harmon | H04M 1/0247 |

(Continued)

FOREIGN PATENT DOCUMENTS

DE 60038636 T2 6/2009

OTHER PUBLICATIONS

"Flexible OLCD"; Flexible OLCD | Technology | Flexible Electronics | FlexEnable- . . . ; https://www.flexenable.com/technology/flexible-olcd/, printed Jun. 30, 2020, 3 pages.

(Continued)

*Primary Examiner* — Tuyen K Vo
(74) *Attorney, Agent, or Firm* — Foley & Lardner LLP

(57) ABSTRACT

A system and method for providing animated feedback for a barcode scanning system may include receiving image data from a camera, processing the image data, detecting a machine-readable indicia in the image data, and attempting to decode the machine-readable indicia. In response to successfully decoding the machine-readable indicia, displaying a first animation indicative of successfully decoding the machine-readable indicia. Otherwise, in response to not successfully decoding the machine-readable indicia, displaying a second animation indicative of not successfully decoding the machine-readable indicia.

20 Claims, 13 Drawing Sheets

(56) References Cited

U.S. PATENT DOCUMENTS

| | | |
|---|---|---|
| 10,474,857 B2 | 11/2019 | Todescato et al. |
| 2003/0001018 A1 | 1/2003 | Hussey et al. |
| 2003/0006290 A1* | 1/2003 | Hussey .............. G06K 7/10851 235/472.01 |
| 2003/0206150 A1* | 11/2003 | Hussey .............. G06K 7/10881 345/156 |
| 2005/0164633 A1* | 7/2005 | Linjama ............ H04W 52/0254 455/41.2 |
| 2005/0194446 A1* | 9/2005 | Wiklof ................. G06K 7/0004 235/462.46 |
| 2006/0266840 A1* | 11/2006 | Vinogradov ....... G06K 7/10544 235/462.45 |
| 2011/0121077 A1* | 5/2011 | Joseph ............... G06K 7/10722 235/462.11 |
| 2014/0210857 A1 | 7/2014 | Liu et al. |
| 2016/0381194 A1* | 12/2016 | Lei ...................... H04M 1/0268 455/566 |
| 2018/0011631 A1* | 1/2018 | Ballesteros .......... G06K 7/1413 |
| 2019/0347608 A1 | 11/2019 | Hall et al. |

OTHER PUBLICATIONS

"Flexible OLED displays"; Flexible OLED Displays | Technology | Flexible Electronics | FlexEnable- . . . ; https//www.flexenable. com/technology/flexible-oled-displays/; printed Jun. 30, 2020, 2 pages.

* cited by examiner

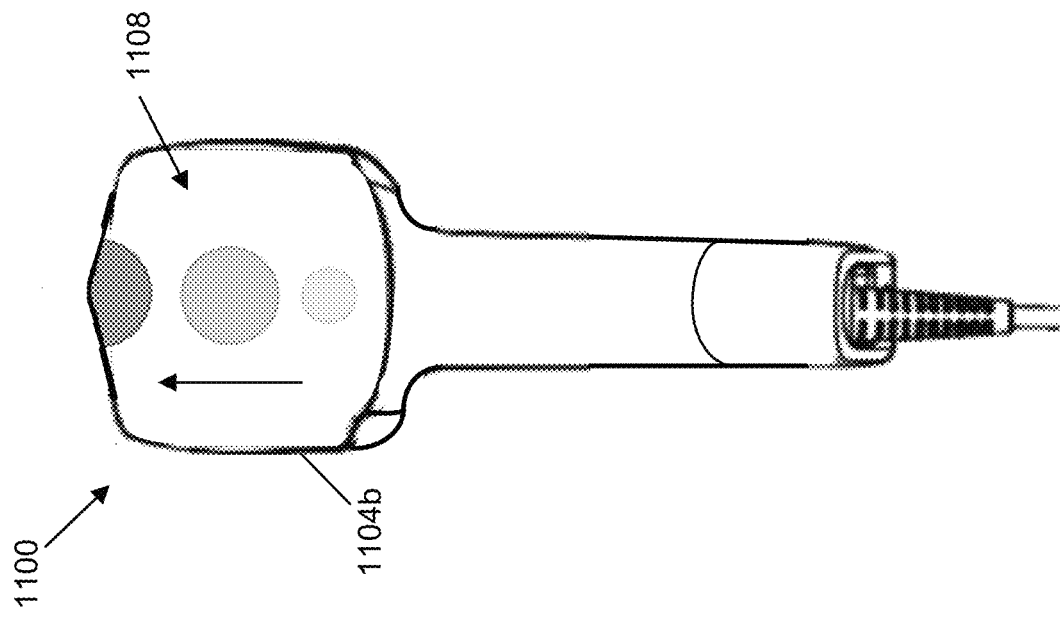
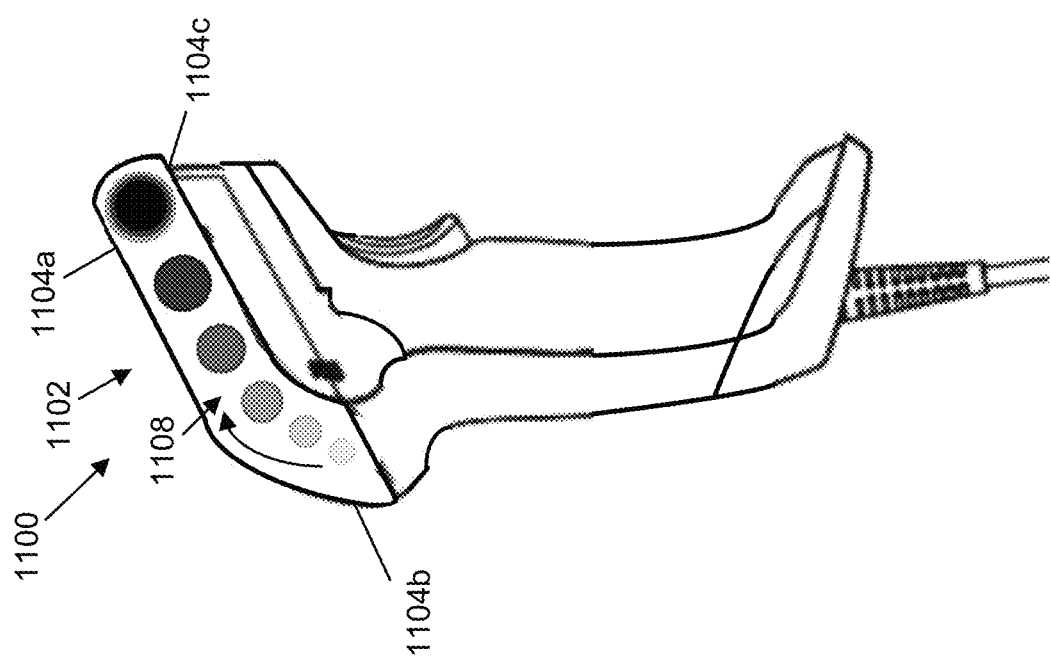

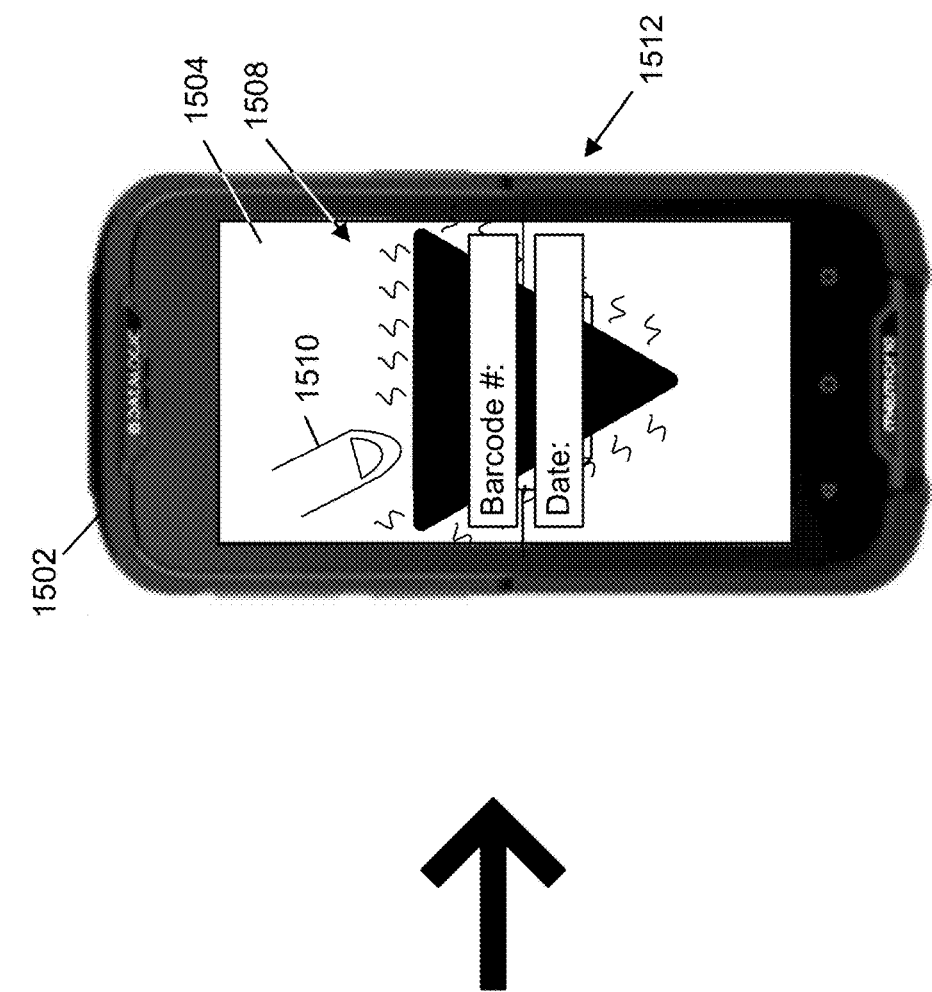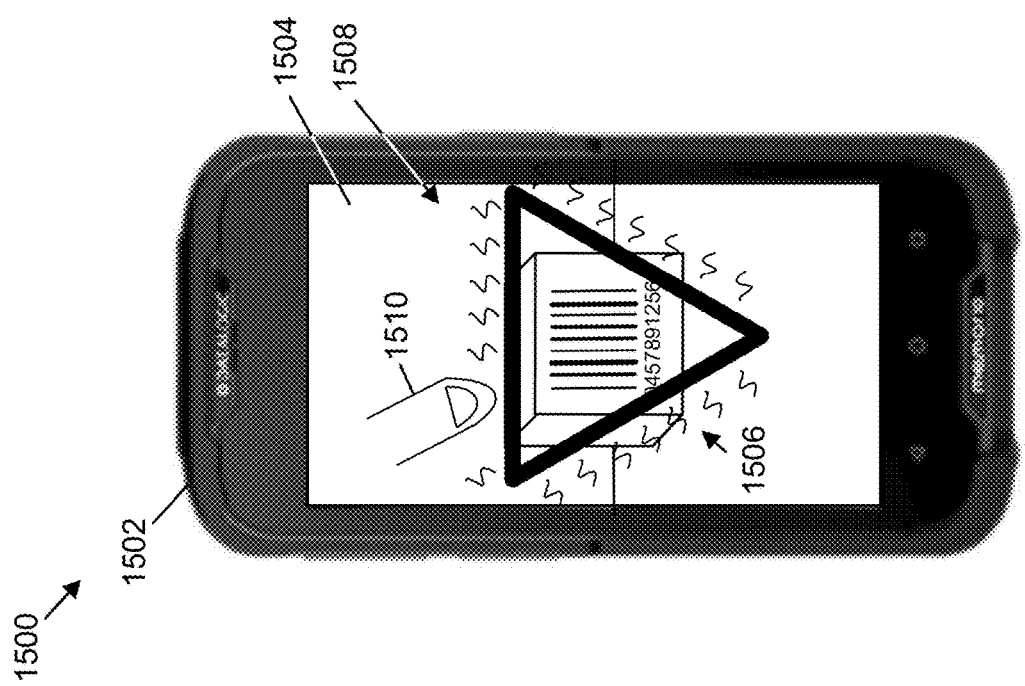
FIG. 15

BARCODE SCANNER SYSTEM WITH ANIMATED FEEDBACK

BACKGROUND

Machine-readable indicia, such as barcodes, QR codes, visual features or patterns, and watermarks, such as the Digimarc® barcode, are essentially representations of information in a visual format. Such indicia may include data characters and/or overhead characters represented by a particular sequence of bars and/or spaces that may have varying widths. Such indicia have widespread applications. For example, machine-readable indicia can be used to identify a class of objects or unique items. As a result, these indicia are found on a wide variety of objects, such as documents, retail goods, shipping boxes, product parts, company assets, and so on.

There are several types of data readers used for reading machine-readable indicia. The most common types of readers are laser-based barcode scanners and imaging-based barcode scanners. A laser-based barcode scanner typically moves, i.e. scans, a laser light beam across the barcode. Imaging-based barcode scanners typically include solid state image circuitry, such as charge coupled devices (CCD) or complementary metal-oxide semiconductor (CMOS) devices, and may be implemented using a one-dimensional or two-dimensional imaging array of photo-sensors or pixels to capture an image of the optical indicia. One-dimensional CCD readers capture a linear cross-section of the indicia, producing an analog waveform whose amplitude represents the relative darkness and lightness of the indicia. Two-dimensional CCD or CMOS readers may capture an entire two-dimensional image.

Often, users attempt to use imaging-based barcode scanners to scan machine-readable indicia in bulk. Examples of facilities where such use occurs include shipping facilities to keep track of packages that have been shipped and retail or grocery stores to keep track of the quantity of items that are received or that are in stock. In such facilities, it can be important to quickly and accurately scan the machine-readable indicia so the respective facility can maintain a count of the number of items it has in stock or that have been shipped. If scans take too long or are inaccurate, facilities may become overloaded with stock or develop inaccurate inventory lists.

Upon capturing image data of machine-readable indicia, imaging-based barcode scanners may detect the machine-readable indicia and attempt to decode them. Depending on the image quality (e.g., noise affecting the image, contrast, focus of the image, brightness, number of pixels displaying the machine-readable indicia, amount of the machine-readable indicia that is in the image data, etc.) of the image data, the imaging-based barcode scanners may successfully or unsuccessfully decode the machine-readable indicia.

In many instances, barcode scanners may provide an element of feedback to inform a user that a scan was successful or unsuccessful. Different feedback features may be more or less effective at enabling a user to determine the status of a scan decoding. For example, feedback mechanisms may include a visual feedback that projects a light pattern (e.g., green spot) on a barcode being scanned, lights up on the barcode scanner, or a decoding result that is displayed on a user interface of the barcode scanner. Each of these feedback mechanisms have limitations for a user. For example, the projected feedback light may be difficult to see depending on the ambient brightness of the area on the surface of an object being scanned and/or because of the target distance (e.g., the target distance may be too far, thereby causing the light to be too faint on the target, or too close, thereby causing the scanner to impede the view of the observer), ambient light on the barcode scanner in the case of an LED light on the scanner, and the decoding result may be difficult to see among other numbers and static graphics that appear on the user interface. As a result, it may be difficult for users to quickly or accurately determine whether scans are successful. Users may rescan the same machine-readable indicia or spend extra time to make sure a scan was successful before scanning the next machine-readable indicia, thereby substantially slowing an individual or bulk scanning process.

Designers of barcode scanner may try to compensate for the aforementioned ineffective feedback mechanisms by increasing the light intensity of feedback lights or by removing important information (e.g., a current inventory count) from the interface. Increasing the light intensity may cause the light to be too bright in some environments, while removing the important information from the interface may cause the scanning process to take even longer as users attempt to view the information that was removed. Therefore, there is a need for an improved barcode scanner device and method of producing feedback to present the decoding status of a machine-readable indicia to a user.

SUMMARY

To overcome the shortcomings of conventional scanner systems that are limited to light and/or other result-oriented feedback (e.g., audible buzzing or beeping, tactile feedback such as vibrations, etc.), a user-customized animation based feedback on a user interface of a barcode reader may be utilized. The subject matter described herein provides an optimized feedback system in which an animation that is singularly associated with a particular scan decoding status may be displayed on an electronic display of a barcode scanner system. Animations may be associated with one or more decoding statuses, such as decoding in progress, successful decode, unsuccessful decode. Features of the animations may be configured to change over time so a user can more readily determine the status of a decoding attempt and decode another machine-readable indicia upon viewing a successful decoding animation. Furthermore, animations can be optionally integrated with sound effects. The animations may be highly perceivable because human peripheral vision is highly sensitive to movement and a change in light and/or color. In some embodiments, the animations may be user-interactable. A user may readily determine that a decoding attempt was unsuccessful or incorrect based on an animation and/or a decoding result and manually input the correct value for the relevant machine-readable indicia on a form displayed on the animation, thus enabling the user to ensure decoding attempts are accurate and complete.

In an embodiment, a barcode scanner system may include a camera configured to capture image data, an electronic display configured to display information including graphics, a memory, and a processor in communication with the camera, memory, and electronic display. The processor may be configured to receive image data from the camera, process the image data, detect a machine-readable indicia in the image data, and attempt to decode the machine-readable indicia. In response to successfully decoding the machine-readable indicia, the processor may be configured to display a first animation indicative of successfully decoding the machine-readable indicia, otherwise, in response to not successfully decoding the machine-readable indicia, the processor may be configured to display a second animation indicative of not successfully decoding the machine-readable indicia.

In an embodiment, a method for providing animated feedback for a barcode scanner system is provided. The method may include receiving image data from a camera, processing the image data, detecting a machine-readable indicia in the image data, and attempting to decode the machine-readable indicia. The method may further include, in response to successfully decoding the machine-readable indicia, displaying a first animation indicative of successfully decoding the machine-readable indicia, otherwise, in response to not successfully decoding the machine-readable indicia, displaying a second animation indicative of not successfully decoding the machine-readable indicia.

Optional features of one aspect may be combined with any other aspect.

BRIEF DESCRIPTION OF THE DRAWINGS

Illustrative embodiments of the present invention are described in detail below with reference to the attached drawing figures, which are incorporated by reference herein and wherein:

FIG. 11A is an illustration of a perspective view of a barcode scanner system that has an electronic display positioned on a rear, side, and top surface of a housing of the barcode scanner system and molded to wrap around the surfaces of the housing, according to an illustrative embodiment;

FIG. 11B is an illustration of a second perspective view of the barcode scanner system of FIG. 11A, according to an illustrative embodiment;

FIG. 15 is an illustration of a sequence of a user interacting with an animation displayed on an electronic display of a barcode scanner system, according to an illustrative embodiment.

DETAILED DESCRIPTION

Figure 1A:
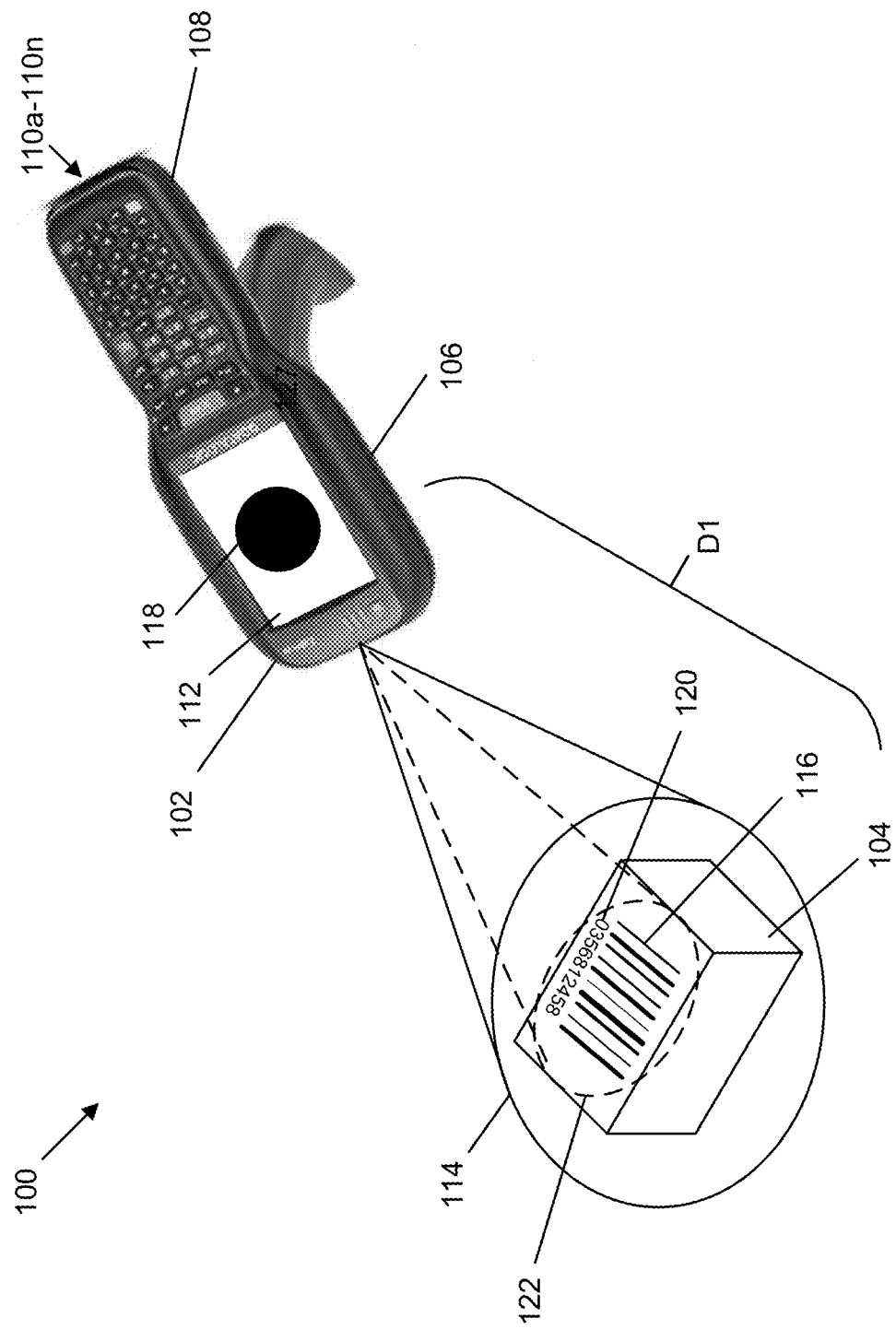
FIG. 1A is an illustration of an environment including a barcode scanner scanning an item at a distance close enough that a feedback illumination signal may be projected onto a machine-readable indicia being scanned, according to an illustrative embodiment.

FIG. 1A is an illustration of an environment 100 with a barcode scanner 102 scanning an item 104 at a distance D1 that is within a range for an illumination source of the barcode scanner 102 to illuminate the item 104 with a feedback illumination signal. For example, D1 may be a distance of between 1 m and 1.5 m that allows for a light projection of a static light indicator (e.g., green spot or red triangle) onto a machine-readable indicia. The barcode scanner 102 may include a main body or housing 106 and a keyboard 108. The keyboard 108 may include multiple buttons 110a-110n (collectively 110) that a user may press to provide inputs into the barcode scanner 102. It should be understood that additional and/or alternative user interface elements (e.g., soft-buttons displayed on a user interface) may be provided for the user to interface with the barcode scanner 102. The main body 106 may house a camera (not shown), whereby the camera may capture images through a lens disposed on a front surface of the main body 106.

The main body 106 may also include an electronic display 112 on its top and/or back surface. The electronic display 112 may be or may include a touch sensitive screen that enables the user to interact with the barcode scanner 102 in multiple ways. The electronic display 112 may convey information to the user, such as current settings, current scanned images, a preview of the image to be captured, previous images, animations indicating various scan statuses or modes, etc. Since the electronic display 112 may be touch sensitive, a user may select animations, icons, settings, or other items on the electronic display 112 to control the barcode scanner 102. Alternative electronic displays, such as electronic displays that are remotely displaced from the barcode scanner 102, may be utilized, as well. For example, the animations and/or icons may be customizable, such as a logo of a company that is animated and shows (i) a first color and/or performs a first action in response to successfully decoding a machine-readable indicia and (ii) a second color and/or performs a second action in response to unsuccessfully decoding a machine-readable indicia.

The camera may be configured to capture images of the area in front of the barcode scanner 102. Digital images may be produced by the camera or an electronic device in electrical communication therewith. The camera may capture images in its field-of-view 114. The camera may capture images, such as images of machine-readable indicia positioned on one or more objects, and transmit the captured images to a processor (see FIG. 2) of the barcode scanner 102 for processing.

During operation, the processor of the barcode scanner 102 may process one or more images of a machine-readable indicia, such as the machine-readable indicia 116, and display animations based on the processing (e.g., successfully or unsuccessfully decoding the machine-readable indicia 116). An animation may be a visible graphic displayed on the electronic display 112 in which at least one feature of the visible graphic is continuously updated by the processor of the barcode scanner 102. In some embodiments, the animation may include visible and/or sensory feedback or content (e.g., audio content such as buzzing, beeping, or music; tactile feedback such as vibrations, etc.). For example, the processor may detect the machine-readable indicia from the captured images, attempt to decode the detected machine-readable indicia, and responsive to the processor successfully decoding the detected machine-readable indicia, select and display an animation that is indicative of successfully decoding the machine-readable indicia. In an embodiment, the animation may display a spot 118. A spot may be a geometric shape (e.g., a circle, diamond, a triangle, a square, an "X", etc.) or non-geometric shape. In one embodiment, the spot 118 may optionally be a circle, such as a green circle, that gradually expands across the electronic display 112 so that a user is able to readily see the successful decoding result (see also FIG. 5). In one embodiment, the spot 118 may be accompanied by sensory content (e.g., verbal communication of decoded content) when it is displayed. Responsive to the processor unsuccessfully decoding a machine-readable indicia, the processor may cause the electronic display 112 to display a different animation, such as a flashing spot, such as a triangle or other shape (see FIG. 6, for example), that is indicative of an unsuccessful decoding of the machine-readable indicia. As will be described in greater detail below, the processor may display animations of any type that enable users to readily determine whether a scan of a machine-readable indicia is successful, unsuccessful, currently being scanned and decoded, or otherwise.

In some embodiments, the barcode scanner 102 may include a light (not shown), such as a green light-emitting diode (LED) that is visible on the main body 106 or keyboard 108. The light may be configured to produce beams of light in the shape of a circle, or any other shape or pattern, directed in front of the barcode scanner 102 and onto a target surface. In some cases, the light may start off as one shape, but, as projected, it may not appear on a target as the same shape. For example, if an object blocks a portion of the light or the target is on an uneven surface, then the light may appear on the target as a different shape than its initial shape. The processor may be configured to cause the light to produce the beams of light, in some cases in addition to displaying corresponding animations on the electronic display 112, in response to determining that a machine-readable indicia was successfully or unsuccessfully decoded. For example, as illustrated in FIG. 1A, the processor of the barcode scanner 102 may detect the machine-readable indicia 116 from an image captured by the camera of the barcode scanner 102. The processor may decode the image of the machine-readable indicia 116 and/or a machine-readable indicia identifier 120 that corresponds to the machine-readable indicia 116. In response to decoding the machine-readable indicia 116, the processor may send a signal to the light of the barcode scanner 102, thereby causing the light to emit a beam of light onto the machine-readable indicia 116. The beam of light may be visible on the machine-readable indicia 116, as illustrated by the light 122 illuminated onto the machine-readable indicia 116. The light of the barcode scanner 102 may emit the beam of light across the distance D1, which has a short enough length to enable the light 122 to be viewable to the user on the machine-readable indicia 116. In some embodiments, the light of the barcode scanner 102 may emit a different colored light (e.g., red, orange, yellow, etc.) or be in a different shape (e.g., a triangle, square, oval, diamond, etc.) responsive to the processor unsuccessfully decoding the machine-readable indicia 116. Accordingly, a user that is using the barcode scanner 102 may readily determine that a decoding of the machine-readable indicia 116 was successful based on the light 122 illuminated onto the machine-readable indicia 116.

Figure 1B:
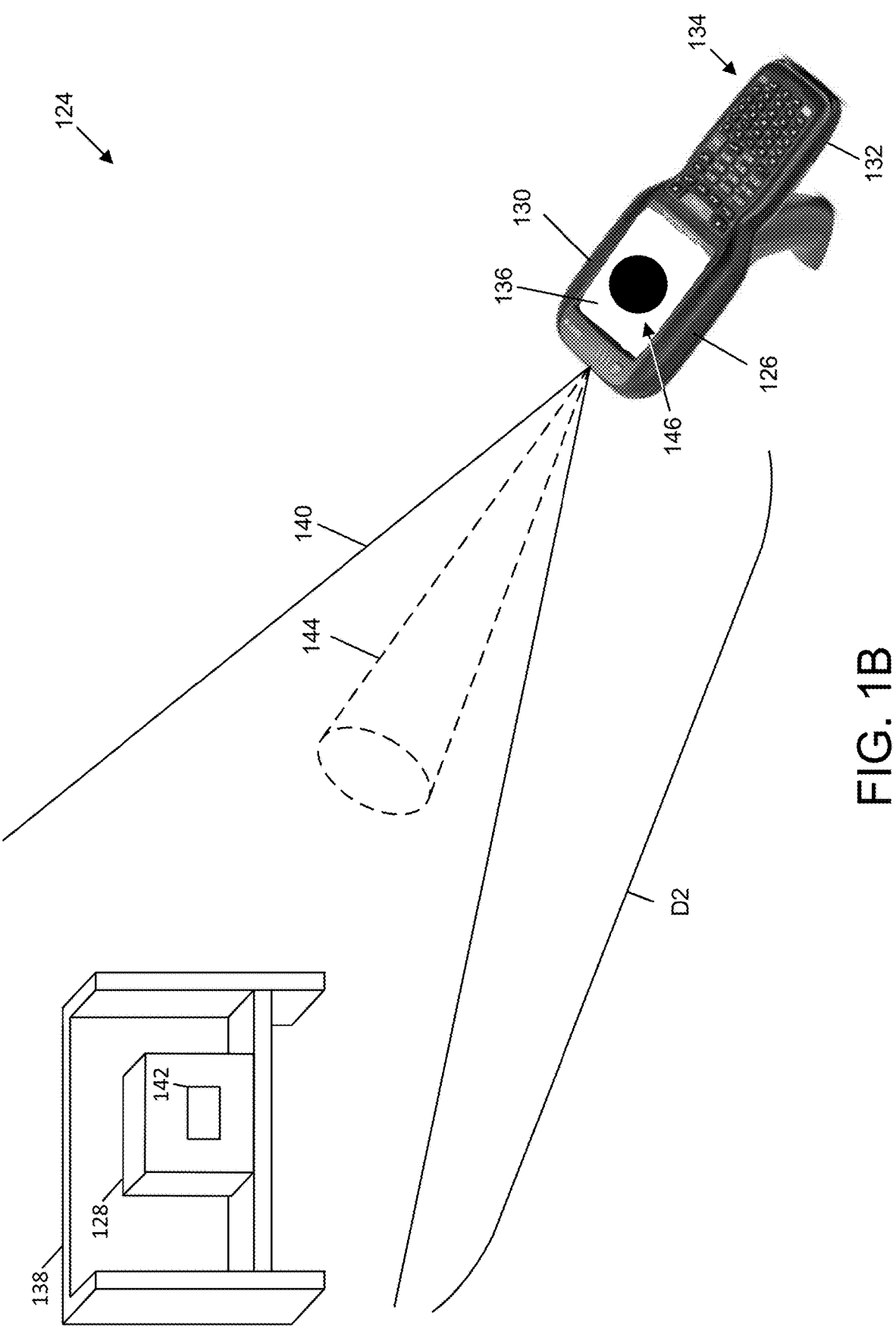
FIG. 1B is an illustration of an environment including a barcode scanner scanning an item at a distance too far for a feedback illumination signal to be projected onto a machine-readable indicia being scanned, according to an illustrative embodiment.

FIG. 1B is an illustration of an environment 124 including a barcode scanner 126 scanning an item 128 at a distance D2. The barcode scanner 126 may include similar components to the barcode scanner 102, shown and described with reference to FIG. 1A. The barcode scanner 126 may include a main body 130 and a keyboard 132. The keyboard 132 may include multiple buttons 134 that enable users to provide inputs to the barcode scanner 126. The main body 130 may include an electronic display 136.

A camera (not shown) of the barcode scanner 126 may capture an image or set of images of an item 128, which may be on a rack 138. The item 128 may be a distance D2 away from the barcode scanner 126. The distance D2 may be longer than the distance D1 (e.g., 1.5 m or less) of FIG. 1A. For example, the distance D2 may be 15 meters or farther, such as 30 meters. The camera may have a field-of-view 140 and capture the image or set of images of the item 128 within the field-of-view 140. The camera may transmit the captured image or set of images to a processor (not shown). The processor may detect or identify a machine-readable indicia 142 disposed on the item 128 from the image or set of images. The processor may attempt to decode the machine-readable indicia 142. Responsive to the processor successfully or unsuccessfully decoding the machine-readable indicia 142, the processor may cause a light (not shown) of the barcode scanner 126 to emit a beam of the projected light pattern 144 towards the machine-readable indicia 142. However, as illustrated, the light of the barcode scanner 126 may not have enough power to reach the machine-readable indicia 142 to enable a user to view the projected light pattern 144 on the machine-readable indicia 142. Accordingly, a user attempting to scan and/or decode the machine-readable indicia 142 may not be able to determine that a scan was successful or unsuccessful from the light emitted from the barcode scanner 126.

As the projected light pattern 144 has a limited range, the barcode scanner 126 may be configured to display an animation 146 on the electronic display 136 to enable the user to determine that a scan was successful or unsuccessful. The animation 146 may be any sequence of light, shapes, colors, brightness, or augmented reality displayed on the electronic display 136. Examples of animations may include, but are not limited to, flashing different colors or brightness, a colored spot that expands its radius until the spot covers a majority or all of the electronic display 136, a "waterfall" effect, a large shape quickly moving to "catch an eye" of the user, etc. An augmented reality animation, in accordance with the principles described herein, may be a display that reproduces the real-time images acquired by the camera and processor with added animated graphical shapes and/or colors that highlight a successfully or unsuccessfully decoded machine-readable indicia. The animation 146 may correspond to either a successful or an unsuccessful decoding and another animation (not shown) may correspond to the other of the two. The animation 146 may be configured to enable a user to readily determine whether a scan was successful despite not being able to see the projected light pattern 144 that is emitted from the barcode scanner 126 responsive to a successful or unsuccessful decoding.

Figure 2:
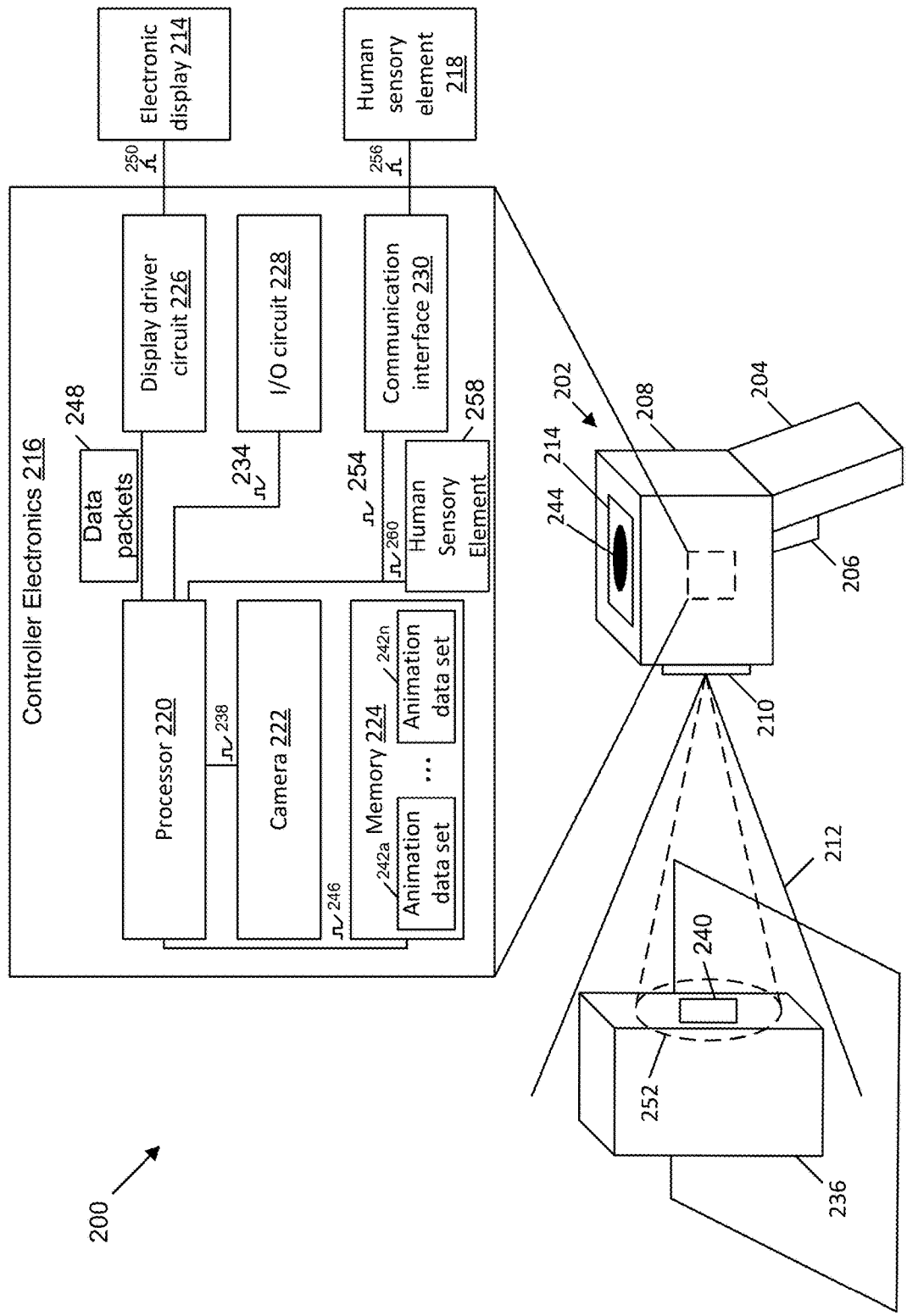
FIG. 2 is an illustration of a barcode scanner system, according to an illustrative embodiment.

FIG. 2 is an illustration of an illustrative barcode scanner system 200. The barcode scanner system 200 may include an illustrative barcode scanner 202 in the form of a "gun." The barcode scanner 202 may include a handle 204, a trigger 206, a main body 208, and a lens and/or window 210. A user may hold the barcode scanner 202 via the handle 204 and trigger scans of machine-readable indicia by pulling the trigger 206. Upon pulling the trigger 206, an image sensor (not shown) may capture one or more images of a scene via the lens 210 in the field-of-view 212. The barcode scanner 202 may decode machine-readable indicia during the scan and display the result of the decoding along with other graphics such as animations, on an electronic display 214. Although shown as part of the main body 208, the electronic display 214 may not be a part of nor be mechanically coupled to the main body 208, such as being wirelessly connected to the barcode scanner 202, in some embodiments.

The main body 208 may include controller electronics 216, which may be in electrical communication with the electronic display 214, the camera, and/or, in some embodiments, a human sensory element 218. The controller electronics 216 may include a processor 220, one or more cameras 222, memory 224, display driver circuit 226, I/O circuit 228, a communication interface 230, and a human sensory element 258. In some embodiments, all or a portion of the electronic components may be connected through a wired connection, such as a data bus. The wired connection may include a serial or universal serial bus (USB) port, whereby the controller electronics 216 may be connected to another device (e.g., the electronic display 214, a human sensory element 218, etc.) via a serial or USB cable. In an alternative embodiment, the controller electronics 216 may use a wireless connection to communicate with other electronic devices. For example, the barcode scanner 202 may include a wireless internet card that enables the controller electronics 216 to connect to a network over a Wi-Fi® communications network, whereby data may be transferred between the controller electronics 216 and an external device using transmission control protocol (TCP). The human sensory element 258 may be or may include a stereo, a speaker, a vibration component, etc.

The processor 220 may implement a processor/microprocessor system to control the operations of the controller electronics 216. The processor 220 may include a single processor or multiple processors for configuring the barcode scanner system 200 as a multi-processor system. The processor 220 may further include suitable logic, circuitry, and interfaces that are operable to execute one or more instructions based on sensor and other data received to perform operations of the barcode scanner system 200. The processor 220 may be realized through a number of processor technologies known in the art. Examples of the processor 220 may include, but are not limited to, an x86 processor, an ARM processor, a Reduced Instruction Set Computing (RISC) processor, an Application-Specific Integrated Circuit (ASIC) processor, an image processor, a digital signal processor, a Complex Instruction Set Computing (CISC) processor, or a soft-core implemented into a programmable logic. The support circuits for the processor 220 may include I/O circuits and interfaces, a conventional cache, power supplies, clock circuits, data registers, or the like. The I/O circuit 228 and the communication interface 230 may be electrically coupled to the processor 220. The I/O circuit 228 may transmit input signals 234, such as inputs from buttons of the barcode scanner 202 or interactive touch screen inputs from the electronic display 214, to the processor 220.

The controller electronics 216 may further include the camera(s) 222 configured to capture an image of an item 236 and to generate image data of the item 236. The lens 210 may be a component of the camera 222. The camera(s) 222 may generate an image signal 238 that includes the image data of the item 236. The camera(s) 222 may transmit the image signal 238 to the processor 220, which may store the image data of the image signal 238 in the memory 224. The processor 220 may retrieve the image data from the memory 224 to process the image signal 238 for reading and/or attempt to decode a machine-readable indicia 240 on the item 236. The machine-readable indicia 240 may include, for example, a barcode (e.g., a one-dimensional, two-dimension, or three-dimensional barcode), QR code, watermark, features and patterns, OCR, or any other machine-readable identifier. In addition, features of the item 236 may include, for example, label positioning, indicia positioning, edges, text, picture, graphic, or other features of the item 236. In an embodiment, the processor 220 may process or pre-process image data captured by the camera 222. In such a configuration, image data is considered to be processed image data as opposed to raw image data.

The processor 220 may retrieve the image data of the item 236 from the memory 224 and process the image data. The processor 220 may process the image data by using object recognition techniques, such as techniques that are well known in the art, to detect the machine-readable indicia 240 from the image data. The processor 220 may detect the machine-readable indicia 240 in the image data, and attempt to decode data represented thereby (e.g., determine the machine-readable indicia value of the machine-readable indicia 240). In one embodiment, the processor 220 may attempt to decode the machine-readable indicia 240 by converting the image data into an alphanumeric value. In one embodiment, the processor 220 may perform a CheckDigit operation on the alphanumeric value and determine whether the machine-readable indicia 240 was successfully decoded based on the output of the CheckDigit operation. The processor 220 may determine whether a decoding attempt was successful. Upon determining whether a decoding attempt was successful, the processor 220 may retrieve one of multiple animation data sets 242a-242n (collectively 242) from the memory 224. The retrieved, selected animation data set, such as animation data set 242a, from the data sets 242 may correspond with the determination of whether the decoding attempt was successful. The processor 220 may display an animation corresponding to the selected animation data set on the electronic display 214.

The memory 224 (e.g., memory, memory unit, storage device, etc.) may include one or more devices (e.g., RAM, ROM, flash memory, hard disk storage, etc.) for storing data and/or computer code for completing or facilitating the various processes, layers, and modules described in the present application. The memory 224 may be or include volatile memory or non-volatile memory. In an embodiment, the memory 224 may be a non-transitory memory. The memory 224 may include database components, object code components, script components, or any other type of information structure for supporting the various activities and information structures described in the present application. According to an illustrative embodiment, the memory 224 may be communicably connected to the processor 220 and may include computer code for executing (e.g., by the processor 220) one or more processes described herein.

The memory 224 may be configured to store animation data sets 242. The animation data sets 242 may each include a graphic including one or more features and/or a preset pattern of adjustments to the one or more features. The graphics may include various shapes, such as a triangle, square, circle, line, character (e.g., "X," "O," etc.), and/or otherwise. In an embodiment, the animation data sets 242 may include graphics instructions for use in causing the processor 220 to create an animation on the electronic display 214. The features may be any one of a position on a user interface, size, color, presence, shape, transparency, brightness, etc. The preset patterns of adjustments may be patterns of adjustments that are implemented by the processor 220 over time as the processor 220 displays the animation on the electronic display 214. Examples of preset patterns of adjustments may include causing a shape or graphic to expand, change color, change shape, change brightness, change transparency, change position, appear and/or disappear, etc. The preset patterns of adjustments may cause the shape or graphic to continuously make such changes for a predetermined time period until the processor 220 stops updating the animation and/or removes the animation from the user interface of the electronic display 214. The predetermined time period may be data of the animation data set 242. The processor 220 may make such preset patterns of adjustments by continuously causing a new frame of the animation data set to be displayed (e.g., play a video of the selected animation data set).

The animation data sets 242 may be associated with a successful or unsuccessful machine-readable indicia decoding. For example, the selected animation data set 242a may be displayed on the electronic display 214, and be of an expanding spot (e.g., spot 244) may be associated with a successful decoding attempt. The animation data set 242a may contain data that, upon being read by the processor 220, causes the spot 244 to expand until at least a majority (or any other proportion) of the electronic display 214 is covered by the spot 244. The animation data set 242a may be associated with a successful decoding attempt based on a flag or setting stored in the memory 224 that indicates that the animation data set 242a is associated with a successful decoding attempt. The flag or setting may be part of the animation data set 242a. Similarly, in another example, the animation data set 242b may be data representative of or cause the processor 220 to display a flashing spot (e.g., red flashing triangle). The animation data set 242b may be associated with an unsuccessful decoding attempt. The animation data set 242b may contain data that, upon being read by the processor 220, causes the spot to repeatedly appear and disappear on the electronic display 214. The animation data set 242b may further include a flag or setting that indicates the animation data set is associated with an unsuccessful decoding attempt. In yet another example, an animation data set 242c may be representative of a moving line, and may be associated with a decoding attempt that is in progress. The animation data set 242c may contain data that, upon being read by the processor 220, causes the spot to repeatedly move back and forth on the electronic display 214. The animation data set 242c may include a flag or setting that indicates the animation data set is associated with a decoding attempt that is in progress.

The animation data sets 242 may be configured to enable a user to readily determine whether a machine-readable indicia was successfully decoded, unsuccessfully decoded, or a decoding is being performed. For example, an animation data set 242a associated with a successful decoding may be associated with a circle and an animation data set 242b associated with an unsuccessful decoding may be associated with a triangle. A user may know which shape is associated with a successful and/or an unsuccessful decoding based on shape, color, and/or otherwise. Accordingly, the user may view the animated shapes to determine whether a decoding of a machine-readable indicia was successful. In another example, an animation data set 242a associated with a successful decoding may be associated with the color green and an animation data set 242b associated with an unsuccessful decoding may be associated with the color red. A user may readily know which color is associated with a successful and/or an unsuccessful decoding of a machine-readable indicia. Accordingly, the user may view the colors to determine whether a decoding of a machine-readable indicia was successful.

In some embodiments, the processor 220 may be configured to enable a user to select which of the animation data sets 242 are representative of or associated with a successful decoding, an unsuccessful decoding, and/or a scan that is in progress. In response to receiving an input, the processor 220 may display one or more of the animation data sets 242 on the electronic display 214. The animation data sets 242 may each include a graphic or image and various features of the graphic or image that the processor 220 may update or change as the processor 220 displays the graphic or image. In some embodiments, the animation data sets 242 may include multiple frames of the graphic or image changing over time. The processor 220 may also display an option that enables a user to select the data sets to display in response to a successful decoding, an unsuccessful decoding, or a decoding that is in progress. A user may select which animation data sets 242 to associate with each of these statuses or modes via the electronic display 214. Upon receiving the selection, the processor 220 may update a flag or setting of the animation data sets 242 to indicate when to display each of the animation data sets 242.

In some embodiments, the animation data sets 242 may be customizable by a user. The processor 220 may enable the user to generate new animation data sets 242 or update existing animation data sets 242. Via the electronic display 214, the processor 220 may enable a user to select time periods for an animation, features of the animation to update, when to make such updates, etc. The processor 220 may also enable the user to upload images or graphics and manually create animation data sets. For example, a user may upload an animation data set 242 that includes an enterprise logo or another graphic and/or sensory content. The user can indicate how long such animations are to be played, which features of the animation for the processor 220 to adjust, the adjustments, a rate for the adjustments (e.g., a flashing frequency, a speed of a spot expansion, a duration a sound is played, a frequency with which a sound is played, etc.), etc. The user can similarly modify already generated animation data sets 242. Accordingly, a user can personalize the animation data sets 242 to provide animated feedback specific to the user.

In response to successfully decoding the machine-readable indicia 240, the processor 220 may display an animation that is associated with a successful decoding on the electronic display 214. To do so, the processor 220 may determine that the decoding attempt was successful and retrieve, via a query signal 246, one of the animation data sets 242 stored in the memory 224 that is associated with a successful decoding. The processor 220 may retrieve an animation data set based on a flag or setting of the animation data set that indicates the selected animation data set is associated with a successful decoding. The processor 220 may display the animation on the electronic display 214. In an embodiment, a first animation data set for successfully decoding a machine-readable indicia and a second animation data set for unsuccessfully decoding a machine-readable indicia may be pre-selected by a user or factory. A user may thereafter select alternative first and second animation data sets.

To display the animation on the electronic display 214, the processor 220 may generate data in data packets 248 or other communications protocol including the animation data of the selected animation data set and transmit the data packet (s) to the display driver circuit 226. The processor 220 may transmit the data packets 248 to the display driver circuit 226. The display driver circuit 226 may receive the data packets 248 and convert the data packets into user interface signals 250 that drive the electronic display 214. The display driver circuit 226 may display the animation of the animation data set 242 on a user interface of the electronic display 214 by transmitting the user interface signals 250 containing the animation and/or updates to features of the animation to electronic display 214. The processor 220 may continuously update the animation on the electronic display 214 by transmitting data packets 248 to the display driver circuit 226 according to the preset pattern of adjustments of the animation data set 242 of the animation being displayed.

In some embodiments, one or more of the animation data sets 242 may be or include sensory data. Upon successfully decoding a machine-readable indicia, the processor 220 may retrieve an animation data set 242 including visual data and/or sensory data, send the visual data in data packets 248 to the display driver circuit 226 for display as visual content on the electronic display 214, and/or send a sensory signal 260 containing the sensory data to the human sensory element 258 for playback as sensory content. In some cases, the human sensory element 258 may play the sensory content concurrently with the display of the visual data. For example, an animation data set 242 for a successful decoding may include an expanding spot and an audible (e.g., beeping) sound. In response to a successful decoding, the processor 220 may retrieve the animation data set 242 including the expanding spot and the audible sound and cause the expanding spot to display on the electronic display 214 and the audible sound to concurrently play on the human sensory element 258. Successful and unsuccessful decoding animation data sets may be or may include visual data and/or sensory data.

In some embodiments, a machine-readable indicia or the item with which the machine-readable indicia is associated may be associated with a type of content. The type of content may be the type of the machine-readable indicia being scanned. For example, the type of content may include alphanumeric content contained in a machine-readable indicia, such as a QR code, an ISBN code, or a bar code. In some embodiments, the type of content can be based on the scanning or the item being scanned. For example, the type of decoded content may be within a category, such as (i) a type of item (e.g., food, electronic device, clothes, brand, etc.) being scanned, (ii) company employing the user that is performing the scanning (e.g., Company A is one type and Company B is another type), (iii) type of company performing the scan (e.g., a shipping company, a retail store, a manufacturing company, etc.), (iv) location (e.g., zip code, city, state, etc.) in which the item originated or will be shipped, (v) location (e.g., geolocation or geopolitical location as indicated by a zip code, for example) of the user that is scanning the item, etc.

The processor 220 may determine a type of content of a machine-readable indicia responsive to a successful decoding. To do so, the processor 220 may analyze the alphanumeric values of the decoded machine-readable indicia. Different alphanumeric values or groups of alphanumeric values may be associated with a particular type of content. For example, the first four numbers of a decoded machine-readable indicia may indicate a location that the item originated. In another example, the second four numbers may indicate a category of the item associated with the machine-readable indicia. In another example, a particular value of the alphanumeric value may indicate the type of company that is performing the scan. Any portion of the alphanumeric value of the decoded machine-readable indicia may be used to determine a type of content of the machine-readable indicia. In another example, the processor 220 may determine the type of content based on the format of the alphanumeric value (e.g., the number of numbers or letters in the value). In some embodiments, the processor 220 may determine a type of content of a machine-readable indicia based on the programming of the processor 220. For example, the programming of the processor 220 may include a flag or setting indicating the location (e.g., geographical location, location within a building, etc.) that the scanning is being performed, the company employing the user that is performing the scan, the type of company performing the scan, etc. The processor 220 may determine the type of content by comparing a portion of the alphanumeric value or the flag or setting, as applicable, to a database or data structure of the barcode scanner 202 that stores (e.g., in a table) relationships between types of content and such flags or settings or portions of alphanumeric values. The processor 220 may determine the type of content of a machine-readable indicia by identifying a match between the flag or setting or portion of the alphanumeric value and a type of content in the database or data structure.

In some embodiments, one or more of the animation data sets 242 may be associated with a type of content. A user may associate an animation data set 242 with a type of content by assigning the type of content to the respective animation data set 242 via a user interface (e.g., electronic display 214). The processor 220 may receive the assignment and update the animation data set 242 associated with the assignment by updating or generating a flag or setting associated with the respective animation data set 242. In some embodiments, in response to successfully decoding the machine-readable indicia 240, the processor 220 may determine a type of content of a machine-readable indicia and identify an animation data set 242 that corresponds to the determined type of content, such as by setting a flag or other parameter that matches the determined type of content). The processor 220 may select the identified animation data set 242 and display and/or play the data from the animation data set 242 via the electronic display 214 and/or the human sensory element 258. In some embodiments, the animation data sets 242 may be stored in one or more databases of the memory 224 based on the type of content with which they are associated. For example, in one embodiment, animation data sets 242 associated with one type of content may be stored in one database or data structure and animation data sets 242 associated with another type of content may be stored in another database or data structure. The processor 220 may identify the type of content of a decoded machine-readable indicia and select an animation data set 242 from the corresponding database or data structure. In one embodiment, the animation data sets 242 may be stored in a hierarchical data structure in which animations data sets 242 that are associated with the same type of content may be connected or linked together. Such organization methods may enable the processor 220 to more quickly retrieve an applicable animation data set 242 quickly when a user is scanning items in bulk.

In response to unsuccessfully decoding the machine-readable indicia 240, the processor 220 may display an animation that is associated with an unsuccessful decoding on the electronic display 214. To do so, the processor 220 may determine that the decoding attempt was unsuccessful and retrieve, via the query signal 246, an animation data set 242 stored in the memory 224 that is associated with an unsuccessful decoding. The processor 220 may retrieve the animation data set 242 based on a flag or setting of the animation data set 242 that indicates the animation data set 242 is associated with an unsuccessful decoding. The processor 220 may display the animation on the electronic display 214 similar to how the processor 220 displayed the animation associated with the successful decoding, as described above.

In some embodiments, in response to determining whether a decoding attempt was successful, the processor 220 may cause a light 252 to be displayed on or around the machine-readable indicia 240. The light 252 may be generated by a light (not shown) of the main body 208. The light 252 may have various features such as color, intensity, and shape. The features of light 252 may correspond to whether the processor 220 successfully decoded the machine-readable indicia 240. For example, the processor 220 may cause a red light to be generated in response to determining that a decoding attempt was unsuccessful and a green light to be generated in response to determining that a decoding attempt was successful. The light of the main body 208 may direct the light 252 at any location around the machine-readable indicia 240. The processor 220 may cause the light 252 to be generated in addition to or instead of displaying an animation on the electronic display 214.

In some embodiments, the processor 220 may transmit signals to the human sensory element 218. The human sensory element 218 may be a watch (e.g., a smartwatch), a ring that lights up, emits noise, or vibrates according to signals received from the processor 220, or other wearable or non-wearable device capable of providing sensory information to the user. The signals may indicate whether an attempted decoding of the machine-readable indicia 240 was successful or unsuccessful. In an embodiment, the processor 220 may transmit signals to the human sensory element 218 by transmitting a sensory signal 254 to the communication interface 230 that includes a data packet. The data packet may contain data indicating whether the decoding was successful. The data packet may include instructions for the human sensory element 218 to enter into a first state associated with a successful decoding or an unsuccessful state associated with an unsuccessful decoding. The instructions may include a flag or setting indicating the first state or the second state. The communication interface 230 may transmit the instructions to the human sensory element 218 in a signal 256. The human sensory element 218 may receive the sensory signal 254 containing the instructions, identify the state from the flag or setting of the instructions, and enter into the identified state.

The states of the human sensory element 218 may be activated in any manner. For example, the human sensory element 218 may be configured to have a strong vibration responsive to a successful machine-readable indicia decoding and a weak vibration responsive to an unsuccessful machine-readable indicia decoding. In another example, the human sensory element 218 may light up in different colors based on whether a decoding was successful (e.g., red if the decoding was unsuccessful and green if the decoding was successful). The ring or watch may be configured to vibrate responsive to the processor 220 successfully decoding the machine-readable indicia 240 or light up responsive to the processor 220 unsuccessfully decoding the machine-readable indicia. The human sensory element 218 may receive a first signal from the processor 220 indicating a successful decoding and vibrate accordingly. The human sensory element 218 may receive a second signal from the processor 220 indicating an unsuccessful decoding and light up accordingly. The ring or watch may be configured to respond to successful and unsuccessful decodings in any manner.

In some embodiments, the processor 220 may be configured to perform an augmented reality by displaying real-time images being captured by the camera 222. The real-time images may include images of the machine-readable indicia 240. The camera 222 may transmit the real-time images via the signal 238. The real-time images may display the field-of-view 212 of the camera 222. The processor 220 may process the real-time images and display the real-time images on the electronic display 214. Additionally, the processor 220 may detect the machine-readable indicia 240 in the real-time images and attempt to decode the machine-readable indicia 240. The processor 220 may display and update an animation that corresponds with whether the processor 220 successfully decoded the machine-readable indicia 240. The processor 220 may overlay the animation at (e.g., on or around) the image of the machine-readable indicia 240 on the electronic display 214. As the camera 222 and its field-of-view 212 changes, the real-time images being displayed on the electronic display 214 may change. The processor 220 may cause the animation to remain in place relative to the location of the machine-readable indicia 240 on the electronic display 214 as the field-of-view 212 changes. The processor 220 may cause the animation to remain in place relative to the location of the machine-readable indicia 240 as the machine-readable indicia 240 moves in the real-time images.

In some embodiments, the processor 220 may be configured to enable a user to interact with an animation being displayed on the electronic display 214. In an embodiment, the user may interact with the animation by pressing on the electronic display 214. The electronic display 214 may detect the pressing and, in some cases, the location of the pressing and transmit a signal to the processor 220 indicating that the user interacted with the electronic display 214 and, in some cases, the location of the electronic display on which the user pressed. In some cases, receiving the user interaction signal may cause the processor 220 to display a virtual form on the user interface. The virtual form may include one or more fields to receive an input containing a machine-readable indicia and, in some cases, a current date. The processor 220 may display the virtual form over the animation being displayed.

A user may interact with an animation after the processor 220 unsuccessfully or incorrectly decodes the machine-readable indicia 240. For example, the processor 220 may display an animation associated with an unsuccessful decoding. The user may view the animation, select the animation via the electronic display 214, and input the value of the machine-readable indicia 240. In another example, the processor 220 may display an animation associated with a successful decoding, but with the incorrect decoding value (e.g., an incorrect machine-readable indicia value). The user may select the animation and input the correct value. Enabling the user to input information associated with machine-readable indicia may improve the accuracy and breadth (e.g., amount) of information that the processor 220 obtains from machine-readable indicia 240.

In some embodiments, the processor 220 may cause multiple animations to be displayed on the electronic display 214. The processor 220 may process image data of real-time images that contain multiple machine-readable indicia. The processor 220 may detect and attempt to decode each machine-readable indicia. The processor 220 may generate, display, and update an animation over one or more of the machine-readable indicia being displayed on the electronic display 214. A user may interact with each animation to input information about the corresponding machine-readable indicia such as barcode information and the date of the decoding.

In some embodiments, the electronic display 214 may be flexible so that it can be molded around the main body 208. For example, the electronic display 214 may extend along a rear, side, and/or top surface of the main body 208, wrapping around the shape of the main body 208 and its surfaces. The electronic display 214 may be an LCD, LED, or OLED display, for example. The processor 220 may display the animations corresponding to whether a decoding was successful on the electronic display 214 on any number of the surfaces of the main body 208. For example, in response to successfully decoding the machine-readable indicia 240, the processor 220 may generate an animation in which a firework shoots off from a position on the rear surface of the main body 208 and moves until the firework explodes on the top surface of the main body 208. Such an animation may be more visible than animations that are only displayed on one surface of the main body 208. The use of a flexible LCD, LED or, OLED displays may allow for barcode scanner designs that have not previously been able to have electronic displays on multiple and/or complex shaped surfaces for cost, technical reasons, and/or other reasons.

Figure 3:
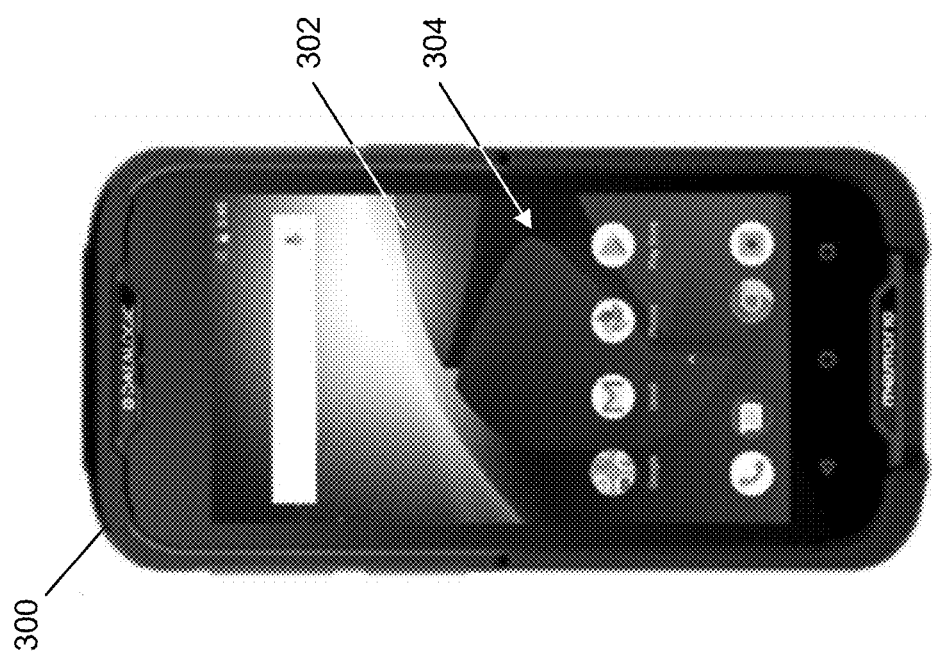
FIG. 3 is an illustration of an electronic display showing an illustrative user interface of a barcode scanner system, according to an illustrative embodiment.

FIG. 3 is an illustration of an electronic display 302 of a barcode scanner system 300. The electronic display 302 may display an interactable user interface 304 that enables a user to interact with the barcode scanner system 300 through touch. Via the user interface 304, the user may access various applications including a scanning application. Features (e.g., brightness, colors, etc.) of the user interface 304 may be updated responsive to a successful decoding, an unsuccessful decoding, and/or a decoding that is currently in progress. Real-time images and animations may be presented on the user interface 304. As previously described, and as will be described in greater detail below, the electronic display 302 may display different animations as the barcode scanner system 300 attempts to decode machine-readable indicia.

Figure 4:
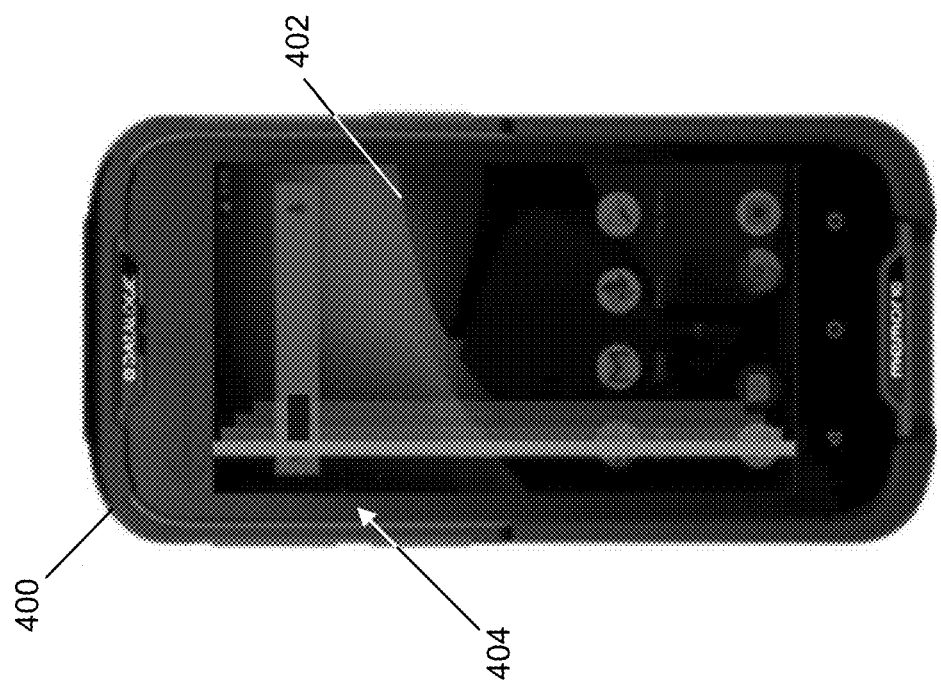
FIG. 4 is an illustration of a moving bar animation on an electronic display of a barcode scanner system while reading and decoding a machine-readable indicia, according to an illustrative embodiment.

FIG. 4 is an illustration of a moving bar animation 404 on an electronic display 402 of a barcode scanner system 400. The moving bar animation 404 may be displayed responsive to the barcode scanner system 400 attempting to decode a machine-readable indicia. The moving bar animation 404 may depict a graphic, such as a straight or curved bar, that moves back and forth across the electronic display 402. The bar may move at constant or changing speeds, in some cases the speed is based on how close the barcode scanner system 400 is to completing a scan or decoding of a machine-readable indicia. The bar may be orange or any other color, as may be configured by a user. In some embodiments, as with any other animations, the moving bar animation 404 may be associated with a darkened electronic display 402 (e.g., when the barcode scanner system 400 displays the moving bar animation 404, the barcode scanner system 400 may also darken the user interface of the electronic display 402 so as to limit distraction and/or limit visually impairing the user). The electronic display 402 may get darker or lighter when the animation appears, depending on the configuration of the respective animation and/or the barcode scanner system 400.

Figure 5:
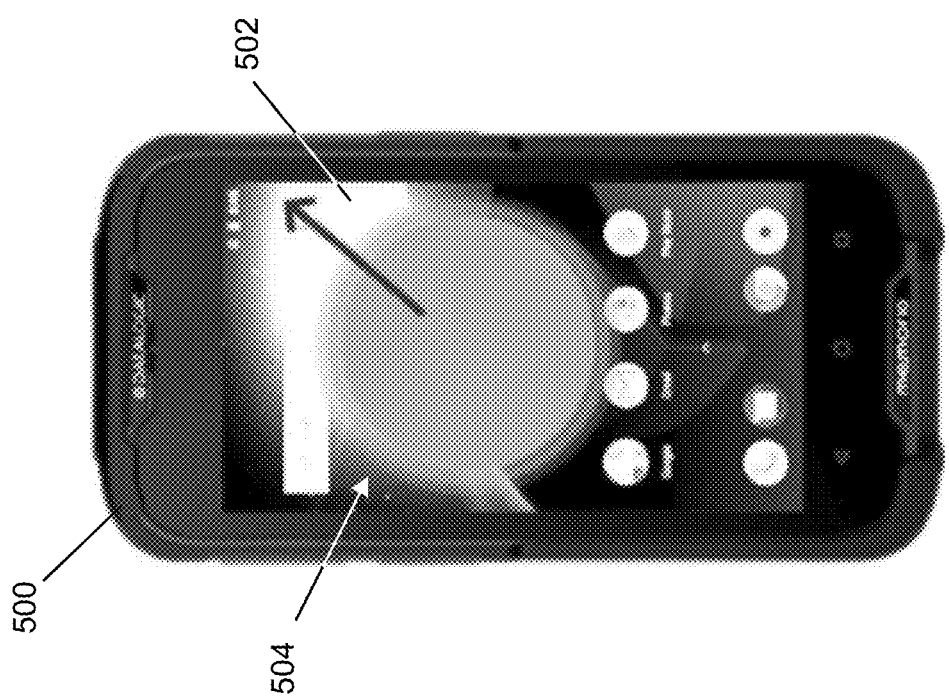
FIG. 5 is an illustration of an expanding spot (e.g., circle) animation displayed on an electronic display of a barcode scanner system in response to successfully decoding a machine-readable indicia, according to an illustrative embodiment.

FIG. 5 is an illustration of an expanding spot animation 504 on an electronic display 502 of a barcode scanner system 500. The expanding spot animation 504 may be displayed responsive to the barcode scanner system 500 successfully decoding a machine-readable indicia. The expanding spot animation 504 may expand over time (e.g., gradual expansion, rapid expansion, or pulsating by repeatedly expanding and contracting) after the barcode scanner system 500 determines a decoding of a machine-readable indicia was successful. In some embodiments, the spot of the expanding spot animation 504 may expand until at least a majority or all of the electronic display is covered by the spot. In an embodiment, the spot may be green. Alternatively colors, static or dynamic, may be utilized. The brightness of the electronic display 502 may also increase (or decrease) responsive to a successful decoding. It should be noted that the expanding spot animation 504 is representative of an expanding animation. Expanding animations may have any shape and/or color. It should also be understood that any alphanumeric text may be displayed on the electronic display 502, as well. Moreover, the animation 504 may be user interactive such that a user may tap the animation 504 to learn more details and/or enter additional information, such as a confirmation that the code associated with the machine-readable indicia being scanned is correct.

Figure 6:
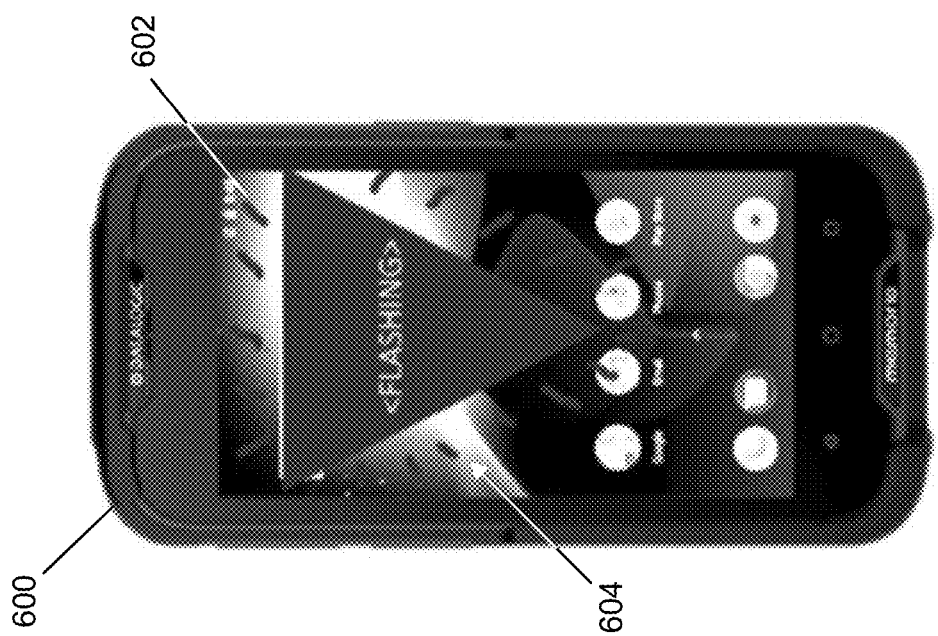
FIG. 6 is an illustration of a flashing spot (e.g., triangle) animation displayed on an electronic display of a barcode scanner system in response to failing to or otherwise unsuccessfully decoding a machine-readable indicia, according to an illustrative embodiment.

FIG. 6 is an illustration of a flashing spot animation 604, which may be different in shape and/or color, from the spot animation 504 of FIG. 5, on an electronic display 602 of a barcode scanner system 600. The flashing spot animation 604 may be displayed responsive to the barcode scanner system 600 unsuccessfully decoding a machine-readable indicia. The spot may gradually appear and disappear on the electronic display 602 over time after the barcode scanner system 600 determines a decoding of a machine-readable indicia was unsuccessful. The spot may flash for a predetermined time period that may be input by a user. The spot may be red. The brightness of the electronic display 602 may also increase (or decrease) responsive to an unsuccessful decoding. It should be noted that the flashing spot animation 604 is representative of a flashing animation. Flashing animations may have any shape and/or color. It should also be understood that any alphanumeric text may be displayed on the electronic display 602, as well. Moreover, the animation 604 may be user interactive such that a user may tap the animation 604 to learn more details and/or enter additional information, such as a code associated with the machine-readable indicia being scanned.

Figure 7:
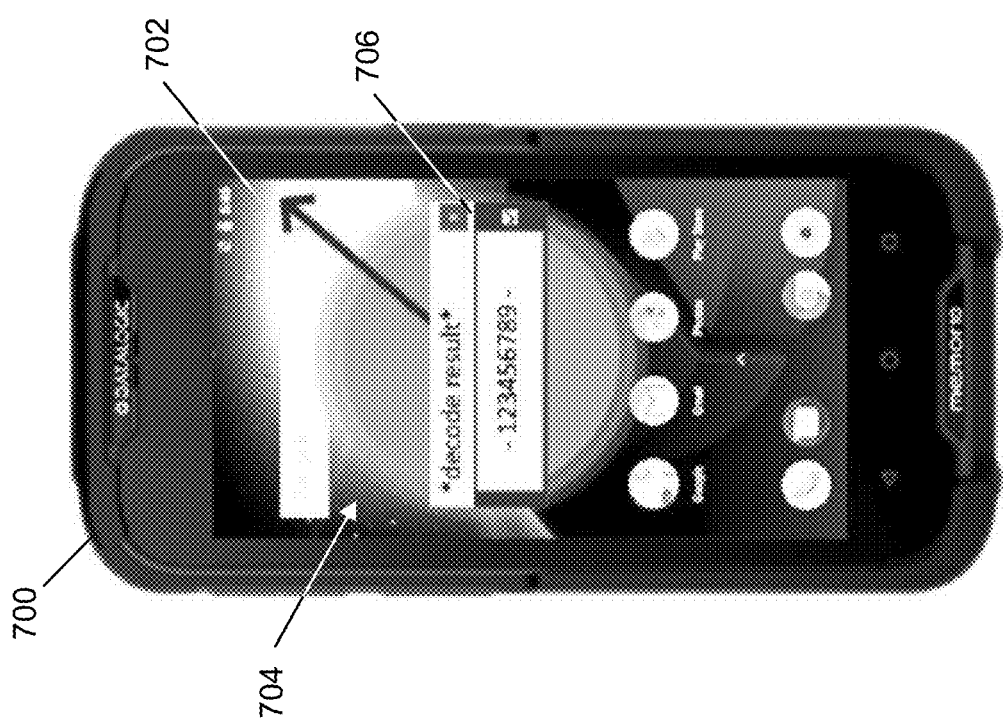
FIG. 7 is an illustration of an expanding spot animation and a decoded result displayed on an electronic display of a barcode scanner system in response to successfully decoding a machine-readable indicia, according to an illustrative embodiment.

FIG. 7 is an illustration of an expanding spot animation 704 and a decoding result 706 on an electronic display 702 of a barcode scanner system 700. The expanding spot animation 704 and the decoding result 706 may be displayed responsive to the barcode scanner system 700 successfully decoding a machine-readable indicia. The expanding spot animation 704 may be similar to the expanding spot animation 504, shown and described with reference to FIG. 5. The decoding result 706 may be a numerical or alphanumerical value that was decoded from the machine-readable indicia. In some embodiments, a user may interact with the animation and/or decoding result 706 to update the decoding result 706. Any information may overlay or otherwise accompany the expanding spot animation 504 or any other animation.

Figure 8:
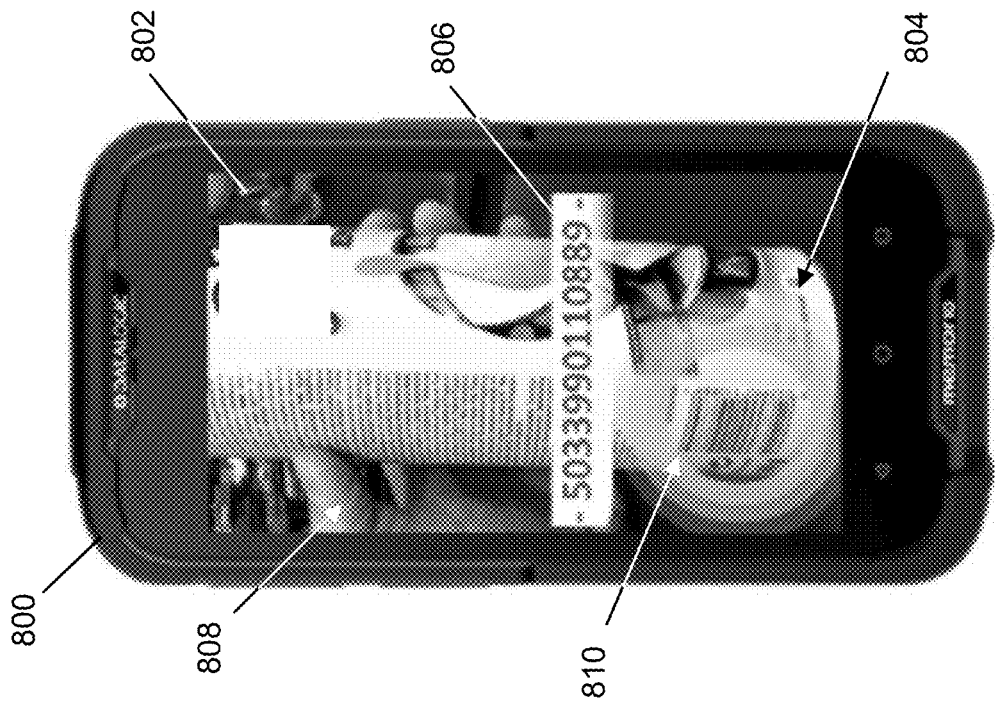
FIG. 8 is an illustration of an augmented reality animation and a decoded result displayed on an electronic display of a barcode scanner system to assist a user with determining whether machine-readable indicia was successfully or unsuccessfully decoded, according to an illustrative embodiment.

FIG. 8 is an illustration of an illustrative barcode scanner system 800 including an electronic display 802 displaying an augmented reality animation 804 and a decoded result 806. The augmented reality animation 804 may be a pulsing green spot. The augmented reality animation 804 may be any animation that corresponds to a successful or unsuccessful decoding. The electronic display 802 may include real-time images 808 that a camera (not shown) of the barcode scanner system 800 captures in real-time. The augmented reality animation 804 may be displayed on or over a machine-readable indicia 810. The machine-readable indicia 810 may change locations or positions on the electronic display 802 as the barcode scanner system 800 moves in relation to the machine-readable indicia 810. The augmented reality animation 804 may remain over or around the machine-readable indicia 810 as the machine-readable indicia 810 moves around on the electronic display 802. For example, as a user moves the barcode scanner system 800, the machine-readable indicia 810 moves on the electronic display 802 and the augmented reality animation 804 remains positioned on the machine-readable indicia 810). The decoded result may be displayed near the augmented reality animation 804.

Figure 9B:
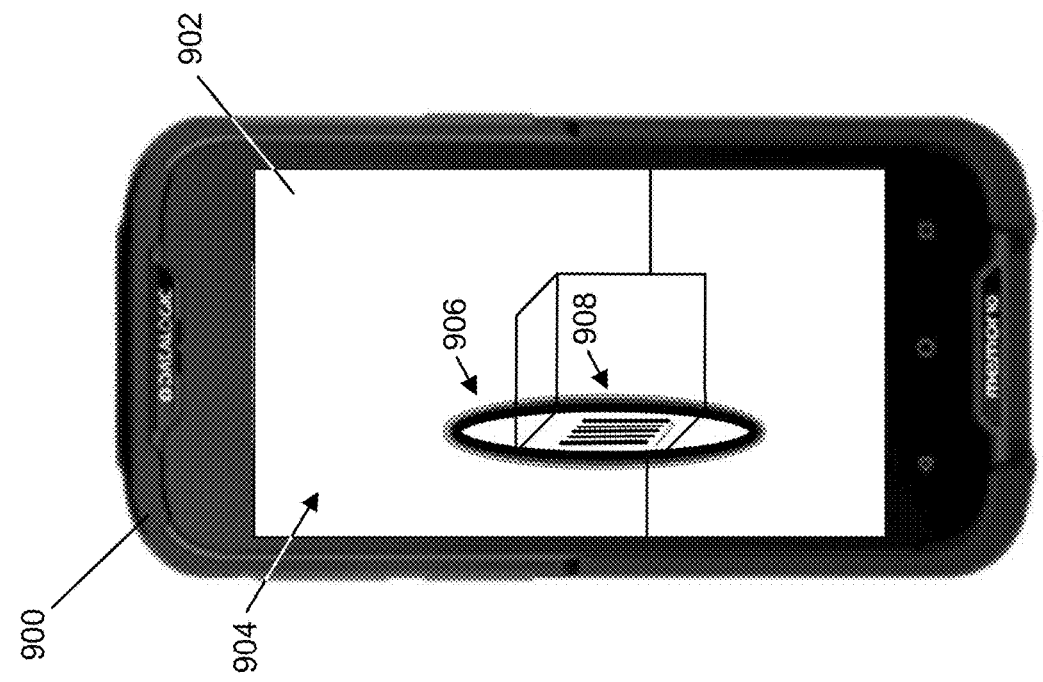
FIG. 9B is an illustration of the augmented reality animation of FIG. 9A displayed on the electronic display of the barcode scanner system in a second view of the machine-readable indicia, according to an illustrative embodiment.
Figure 9A:
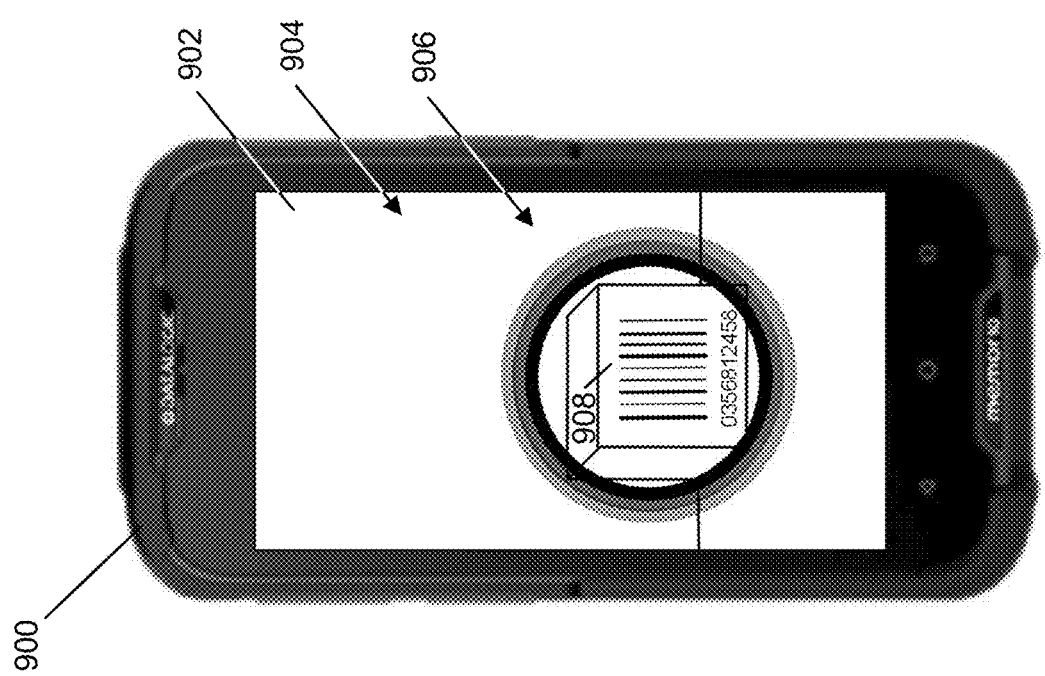
FIG. 9A is an illustration of an augmented reality animation displayed on an electronic display of a barcode scanner system in a first view of a machine-readable indicia, according to an illustrative embodiment.

FIG. 9A is an illustration of an illustrative barcode scanner system 900 with an electronic display 902 displaying an illustrative augmented reality animation 906 on in a first view of a machine-readable indicia 908 disposed on an object (e.g., package, product box, etc.). On the electronic display 902, the barcode scanner system 900 may display real-time images 904 of the current field-of-view of a camera (not shown) of the barcode scanner system 900. The barcode scanner system 900 may process the real-time images 904 and detect the machine-readable indicia 908 in the real-time images 904. The barcode scanner system 900 may attempt to decode the machine-readable indicia 908. Responsive to the barcode scanner system 900 successfully or unsuccessfully decoding the machine-readable indicia 908, the barcode scanner system 900 may display the augmented reality animation 906 on the electronic display 902. The barcode scanner system 900 may identify the location of the machine-readable indicia 908 on the electronic display 902 and place the augmented reality animation 906 over or near (e.g., within one or two inches) the identified location of the machine-readable indicia 908 on the electronic display 902. Accordingly, a user attempting to scan the machine-readable indicia 908 may readily determine where the machine-readable indicia 908 is on the electronic display and whether a decoding attempt was successful based on the augmented reality animation 906.

FIG. 9B is an illustration of the barcode scanner system 900 of the electronic display 902 with the augmented reality animation 906 of FIG. 9A with a second view of the machine-readable indicia 908. The real-time images 904 on the electronic display 902 are shown in the second view of the machine-readable indicia 908. As shown, the real-time images 904 may show the machine-readable indicia 908 at a different angle and in a different location on the electronic display 902. However, as illustrated, the augmented reality animation 906 may move and, in some cases, change shape, to remain over the machine-readable indicia 908. Accordingly, a user may readily determine where the machine-readable indicia 908 is (and whether a scan was successful) as the machine-readable indicia 908 moves locations on the electronic display 902.

Figure 10:
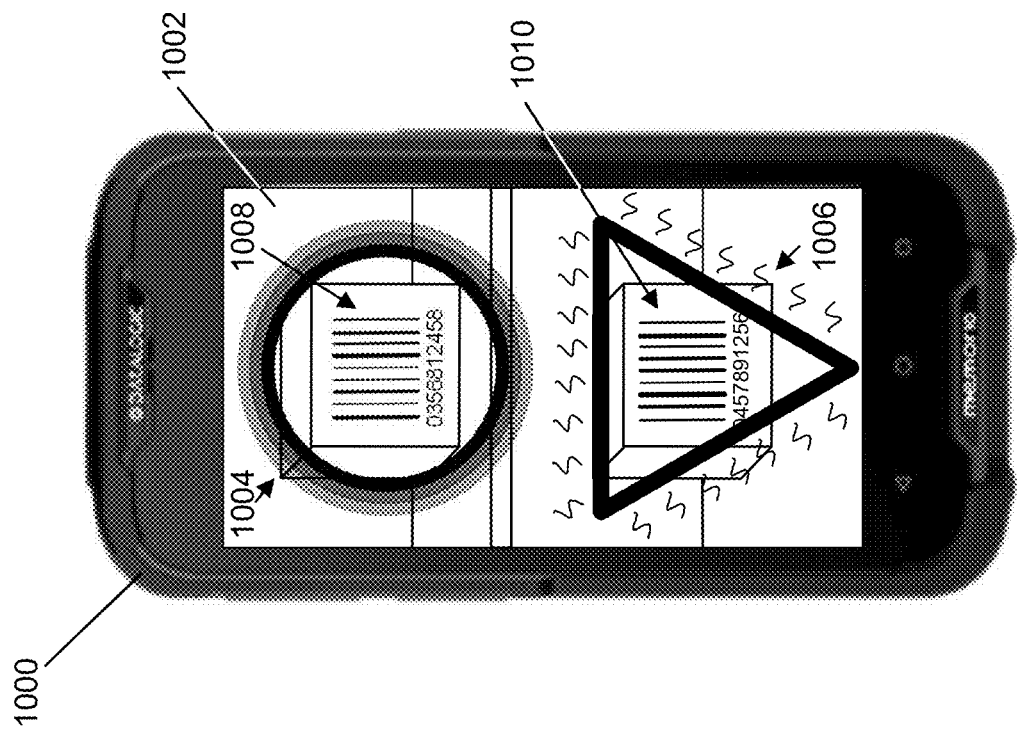
FIG. 10 is an illustration of two animations displayed at two imaged machine-readable indicia on an electronic display of a barcode scanner system, according to an illustrative embodiment.

FIG. 10 is an illustration of an illustrative barcode scanner system 1000 having an electronic display 1002 displaying a first animation 1004 and a second animation 1006. The first animation 1004 may be associated with a successful decoding. In an embodiment, the first animation 1004 may be an expanding green spot, and the second animation 1006 may be associated with an unsuccessful decoding. The second animation 1006 may be a flashing spot. The electronic display 1002 may be displaying real-time images of a first machine-readable indicia 1008 and a second machine-readable indicia 1010. The barcode scanner system 1000 may detect and attempt to decode each machine-readable indicia 1008 and 1010. The barcode scanner system 1000 may successfully decode the first machine-readable indicia 1008 and unsuccessfully decode the second machine-readable indicia 1010. The barcode scanner system 1000 may identify the first animation 1004 as being associated with a successful decoding and identify the second animation 1006 as being associated with an unsuccessful decoding. Accordingly, the barcode scanner system 1000 may display the first animation 1004 over the first machine-readable indicia 1008 and the second animation 1006 over the second machine-readable indicia 1010. The barcode scanner system 1000 may cause the first animation 1004 and the second animation 1006 to display over the first machine-readable indicia 1008 and the second machine-readable indicia 1010, respectively, as the real-time images show different views of the first machine-readable indicia 1008 and the second machine-readable indicia 1010. For instance, the barcode scanner system 1000 may cause the first animation 1004 and the second animation 1006 to remain over the first machine-readable indicia 1008 and the second machine-readable indicia 1010 as the machine-readable indicia 1008 and 1010 change positions on the electronic display 1002. The barcode scanner system 1000 may display any number of animations on the electronic display at one time.

FIG. 11A is an illustration of a perspective view of a barcode scanner system 1100 that has an electronic display 1102 extending along a top surface 1104a, a rear surface 1104b, and a side surface 1104c of a housing 1106 of the barcode scanner system 1100. The electronic display 1102 can be, for example, a flexible LED/LCD display or an OLED display and mold to wrap around the surfaces 1104a-1104c of the housing 1106. The electronic display 1102 may be a foldable display that enables animations to be displayed on both the top surface 1104a and the rear surface 1104b of the housing 1106 of the barcode scanner system 1100. In some cases, an animation may begin on one surface of the housing 1106 and end on another surface of the housing 1106. For example, as illustrated, an animation 1108 may be an expanding spot that gradually moves on the electronic display 1102 from the rear surface 1104b to the top surface 1104a of the housing 1106. In an embodiment, the spot may both move and expand at the same time. The barcode scanner system 1100 may cause such an animation to appear in response to determining that a decoding attempt was successful as described above. The barcode scanner system 1100 may cause other animations to appear on the electronic display 1102 in response to determining a decoding attempt was unsuccessful or in progress. Causing such animations to appear on both the top surface 1104a and the rear surface 1104b may be advantageous because the animations can take up more surface area on the barcode scanner system 1100, making it more likely that a user will notice or see the animation. It should be understood that any shape, message, or other animated feature may be performed on the electronic display 1102 may be utilized in providing for the functionality of performing a first animation in response to successfully decoding a machine-readable indicia, and a second animation in response to unsuccessfully decoding the machine-readable indicia.

FIG. 11B is an illustration of a second perspective view of the barcode scanner system 1100 of FIG. 11A. The second perspective view illustrates the rear surface 1104b and the beginning of the animation 1108 on the electronic display 1102. As shown, the animation 1108 may begin as a small spot on the bottom of the rear surface 1104b. The spot may gradually expand and get darker as it moves towards the top of the rear surface 1104b and onto the top surface 1104a. It should be noted that the moving expanding spot is only an example of an animation that may appear on the electronic display 1102. Other examples may include fireworks that begin on the rear surface 1104b and explode on the top surface 1104a, a waterfall effect in which a waterfall begins on the top surface 1104a and ends on the rear surface 1104b, and colored squares that wrap around each other on the top surface 1104a and the rear surface 1104b. Any animation may be shown on the electronic display 1102.

Figure 12:
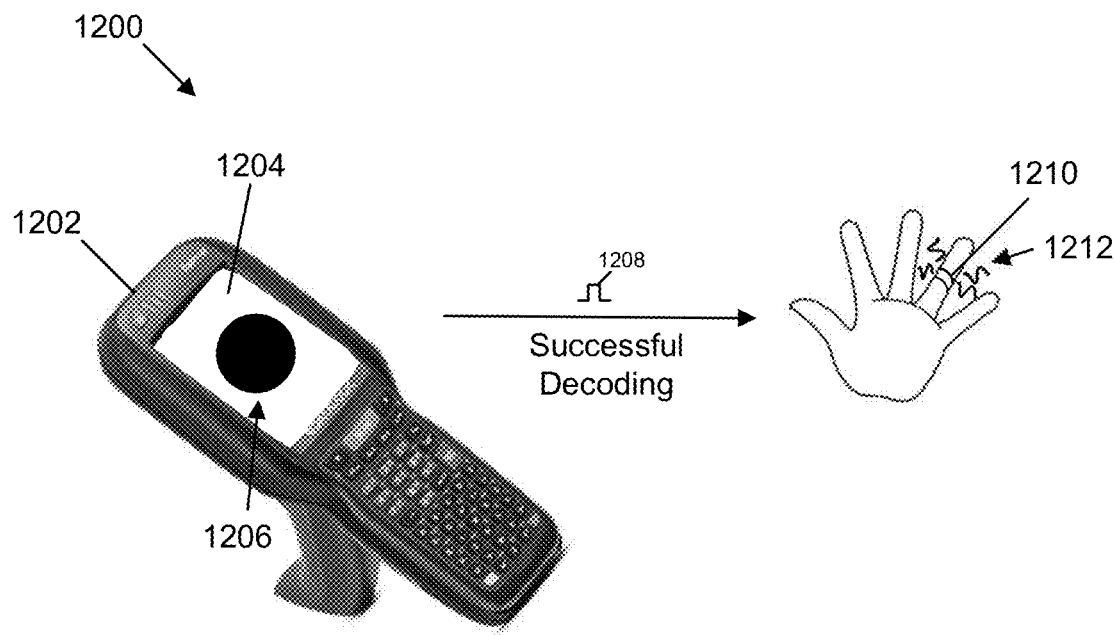
FIG. 12 is an illustration of a barcode scanner system in which a barcode scanner transmits a successful decoding signal to a wearable device worn by a user to notify the user of the successful decoding of a machine-readable indicia, according to an illustrative embodiment.

FIG. 12 is an illustration of a barcode scanner system 1200 configured to communicate with a local device. The barcode scanner system 1200 may include a barcode scanner 1202 that may include an electronic display 1204 configured to display an animation 1206, as previously described. In response to the barcode scanner 1202 successfully decoding a machine-readable indicia, the animation 1206 may be displayed on the electronic display 1204. Further, in response to successfully decoding the machine-readable indicia, the barcode scanner 1202 may transmit a decoding notification signal 1208 to a human sensory device 1210. In one embodiment, the human sensory device 1210 may be or include a ring. The signal 1208 may include instructions containing a flag or setting that causes the human sensory device 1210 to enter into a state associated with a successful decoding. As illustrated, the state may be a vibration state 1212 in which the ring 1210 vibrates. In some embodiments, the human sensory device 1210 may change colors, emit sounds, flash, or change other features in response to receiving an indication of a successful decoding attempt. Successful decoding states of the human sensory device 1210 may enable a user that is scanning machine-readable indicia to readily determine that a decoding attempt was successful.

Figure 13:
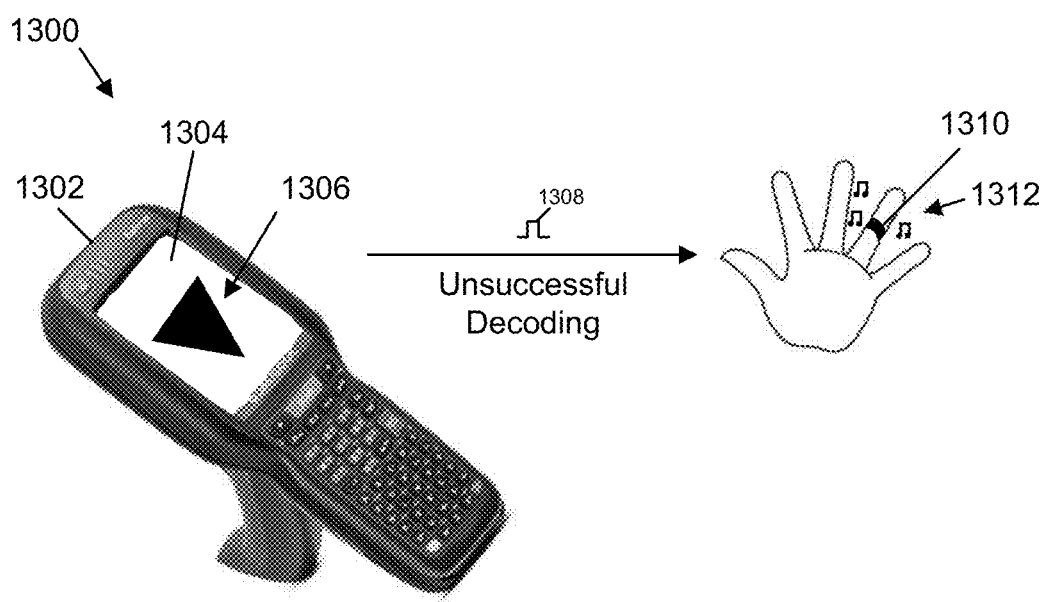
FIG. 13 is an illustration of a barcode scanner system in which a barcode scanner transmits an unsuccessful decoding signal to a wearable device worn by a user to notify the user of she unsuccessful decoding of a machine-readable indicia, according to an illustrative embodiment.

FIG. 13 is an illustration of a barcode scanner system 1300 configured to communicate with a local device. The barcode scanner system 1300 may include a barcode scanner 1302 that includes an electronic display 1304 configured to display an animation 1306. In response to the barcode scanner 1302 unsuccessfully decoding a machine-readable indicia, the animation 1306 may be displayed on the electronic display 1304. Further, in response to unsuccessfully decoding the machine-readable indicia, the barcode scanner 1302 may transmit a decoding signal 1308 to a human sensory device 1310. The human sensory device 1310 may be a wearable device. In one embodiment, the human sensory device 1310 may be a ring. The decoding signal 1308 may include instructions containing a flag or setting that causes the human wearable sensory device 1310 to enter into a state associated with an unsuccessful decoding. As illustrated, the state may be a noise emitting state 1312 in which the human sensory device 1310 emits noise, such as a sound, such as a short tone, buzzer, or music. In some embodiments, the human wearable sensory device 1310 may change colors, emit sounds, flash, or change other features in response to receiving an indication of an unsuccessful decoding attempt. In one embodiment, a successful decoding attempt may associated with one color and an unsuccessful decoding attempt may be associated with another color. Unsuccessful decoding states of the human sensory device 1310 may enable a user that is scanning machine-readable indicia to readily determine that a decoding attempt was unsuccessful.

Figure 14:
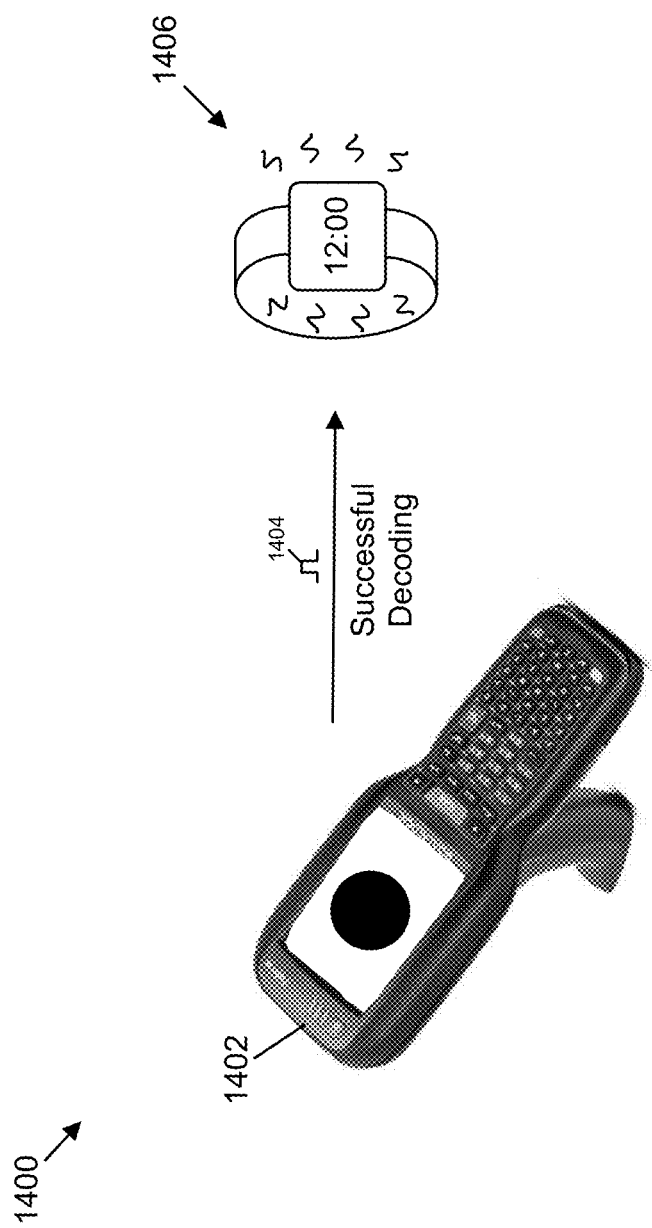
FIG. 14 is an illustration of a barcode scanner system in which a barcode scanner transmits a successful decoding signal to a wearable device worn by a user to notify the user of the successful decoding of a machine-readable indicia, according to an illustrative embodiment.

FIG. 14 is an illustration of a barcode scanner system 1400 in which a barcode scanner 1402 transmits a successful decoding signal 1404 to a local device, such as a human sensory device 1406. In one embodiment, the human sensory device 1406 may be a watch. As illustrated, the human sensory device 1406 may vibrate in response to receiving an indication of a successful decoding attempt. It should be understood that the human sensory device 1406 may be configured to store and provide statistical information associated with the user and/or decoding, such as number of successful versus unsuccessful decodes over a given time period for the user. In an embodiment, the human sensory device 1406 may be configured similar to the human sensory device 1210 and/or 1310, shown and described with reference to FIGS. 12 and 13. Although only a successful decoding state is shown, the watch 1406 may enter into an unsuccessful decoding state responsive to receiving a signal that indicates a decoding attempt was unsuccessful. As with the human sensory device 1210 and/or 1310, in some embodiments, the human sensory device 1406 may change colors, emit sounds, flash, or change other features in response to receiving an indication of a successful or unsuccessful decoding attempt. Although a ring and watch configurations for supporting the barcode scanners are possible, it should be understood that other devices may be utilized, such as wristbands, gloves, headsets, or other wearable or non-wearable device.

FIG. 15 is an illustration of a sequence 1500 of a barcode scanner system 1502 with an electronic display 1504 being used to scan a machine-readable indicia 1506 by a user who may interact with an animation 1508 being displayed on the electronic display 1504. In response to unsuccessfully decoding the machine-readable indicia 1506, the barcode scanner system 1502 may display an animation 1508, which indicates that the decoding attempt was unsuccessful. A user may view the animation 1508 and use his or her finger 1510 to press or interact with the animation 1508. Such interaction may cause the barcode scanner system 1502 to display the virtual forms 1512 on the electronic display 1504. The virtual forms 1512 may enable the user to manually input the barcode number of the machine-readable indicia 1506 and/or the date. The user may input the barcode number by pressing on the virtual forms 1512 and/or by pressing push buttons (not shown) on the barcode scanner system 1502. Accordingly, the user may use animations being displayed on the electronic display 1504 to ensure machine-readable indicia are read successfully.

Figure 16:
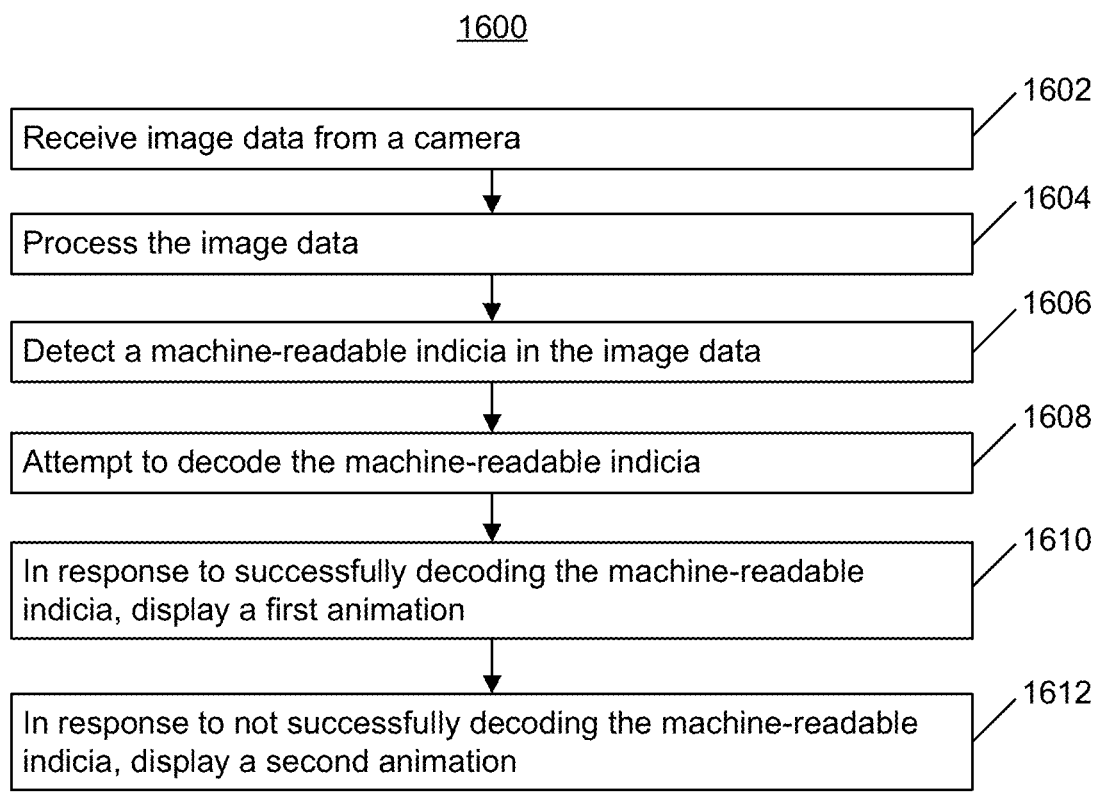
FIG. 16 is a flow diagram of an illustrative process for providing animated feedback, according to an illustrative embodiment.

FIG. 16 is a flow diagram of an illustrative process 1600 for providing animated feedback. At step 1602, image data may be captured by a camera. The image data may include an image of a machine-readable indicia, such as a barcode. In some embodiments, the image data may be real-time image data that may be displayed on an electronic display. The camera may transmit the image data to a processor. At step 1604, the image data may be processed, such as using object recognition techniques on the image data to identify machine-readable indicia in the image data. The processor may display the image data on the electronic display. At step 1606, the machine-readable indicia may be detected in the image data.

At step 1608, a decoding attempt may be performed on the machine-readable indicia. The processor may attempt to decode the machine-readable indicia by reading the machine-readable indicia. The processor may determine whether the decoding attempt was successful. The processor may determine whether the decoding attempt was successful by determining whether the machine-readable indicia is able to be read and/or whether the decoding attempt was accurate.

At step 1610, in response to successfully decoding the machine-readable indicia, a first animation may be displayed. The processor may determine that the decoding attempt was successful. The processor may identify a first animation data set, from a memory, that is associated with a successful decoding attempt. The processor may retrieve the identified first animation data set and display an animation of the first animation data set on the electronic display. The processor may continuously update the animation on the electronic display according to a preset pattern of adjustments of the retrieved first animation data set. In some embodiments, the animation may be a green spot that continuously expands across the electronic display until the green spot covers at least a majority of the electronic display. The animation of the first animation data set may enable a user to readily determine that the decoding attempt was successful.

At step 1612, in response to unsuccessfully decoding the machine-readable indicia, a second animation may be displayed. The processor may determine that the decoding attempt was unsuccessful. The processor may identify a second animation data set, from the memory, that is associated with an unsuccessful decoding attempt. The processor may retrieve the identified second animation data set and display an animation of the second animation data set on the electronic display. The processor may continuously update the animation on the electronic display according to a preset pattern of adjustments of the retrieved second animation data set. In some embodiments, the animation may be a flashing spot. The animation of the second animation data set may enable a user to readily determine that the decoding attempt was unsuccessful. In some embodiments, during the decoding attempt, the processor may display an animation of a third animation data set that corresponds to a decoding attempt that is being performed. The animation of the third animation data set may be a bar that continuously moves back and forth across the electronic display.

Although the processor and other hardware are described as being onboard the barcode scanners, it should be understood that processors and processes that are performed remotely from the barcode scanners may be utilized. It should also be understood that a wide range of alternative animations may be performed and may even be configured to be changed over time (e.g., monthly) so as to maintain alertness by users.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A barcode scanner system, comprising:
   a camera configured to capture image data;
   an electronic display configured to display information including graphics;
   a memory; and
   a processor in communication with the camera, memory, and electronic display, the processor configured to:
   receive image data from the camera;
   process the image data;
   detect a machine-readable indicia in the image data;
   attempt to decode the machine-readable indicia; and
   in response to successfully decoding the machine-readable indicia, display a first animation indicative of successfully decoding the machine-readable indicia,
   otherwise, in response to not successfully decoding the machine-readable indicia, display a second animation indicative of not successfully decoding the machine-readable indicia,
   continuously update the first animation or the second animation being displayed according to a preset pattern of adjustments for at least one feature in the animation; and
   perform an augmented reality by displaying real-time images being captured by the camera with the machine-readable indicia displayed thereon along with the at least one feature displayed at the machine-readable indicia as the camera is capturing new real-time images and the position of the machine-readable indicia moves in the images.

2. The barcode scanner system according to claim 1,
   wherein the memory is configured to store animation data sets indicative of successfully and unsuccessfully decoding machine-readable indicia; and
   wherein the processor is configured to select the animation by retrieving one of the animation data sets stored in the memory in response to determining that the machine-readable indicia was successfully decoded or unsuccessfully decoded.

3. The barcode scanner system according to claim 2, wherein the processor is further configured to enable a user to select data sets representative of the first and second animations from the memory.

4. The barcode scanner system according to claim 3, wherein the data sets representative of the first and second animations are customizable by a user.

5. The barcode scanner system according to claim 3, wherein the first animation is associated with a plurality of data sets, wherein one or more data sets of the plurality of data sets are each associated with a different type of content.

6. The barcode scanner system according to claim 1, wherein the processor is further configured to cause the at least one feature to expand until at least a majority of the electronic display is covered by the at least one feature in response to successfully decoding the machine-readable indicia.

7. The barcode scanner system according to claim 1, wherein the processor is configured to display the first animation having a first shape and the second animation having a second shape, thereby enabling a user to readily determine whether the machine-readable indicia was successfully or unsuccessfully decoded.

8. The barcode scanner system according to claim 1, wherein the first animation has a first color and the second animation has a second color, thereby enabling a user to readily determine whether the machine-readable indicia was successfully or unsuccessfully decoded.

9. The barcode scanner system according to claim 1, further comprising a housing including multiple surfaces, and wherein the electronic display extends along the multiple surfaces of the housing.

10. The barcode scanner system according to claim 1, wherein the processor is further configured to display a third animation when a user is performing a scan, the third animation representing a scan mode so that the user knows that scanning and decoding functions are being performed.

11. The barcode scanner system according to claim 1, wherein the processor is further configured to enable a user to interact with the first or second animation.

12. The barcode scanner system according to claim 1, further comprising another electronic device including a human sensory element in communication with the processor, and configured to enable the processor to cause the human sensory element to activate in a first state in response to the machine-readable indicia being successfully decoded and a second state in response to the machine-readable indicia being unsuccessfully decoded.

13. A method for providing animated feedback for a barcode scanner system, the method comprising:
   receiving image data from a camera;
   processing the image data;
   detecting a machine-readable indicia in the image data;

attempting to decode the machine-readable indicia;
in response to successfully decoding the machine-readable indicia, displaying a first animation indicative of successfully decoding the machine-readable indicia,
otherwise, in response to not successfully decoding the machine-readable indicia, displaying a second animation indicative of not successfully decoding the machine-readable indicia;
continuously updating the first animation or the second animation being displayed according to a preset pattern of adjustments for at least one feature in the animation; and
performing an augmented reality by displaying real-time images being captured by the camera with the machine-readable indicia displayed thereon along with the at least one feature displayed at the machine-readable indicia as the camera is capturing new real-time images and the position of the machine-readable indicia moves in the images.

14. The method according to claim 13, further comprising:
storing, in a memory, animation data sets indicative of successfully and unsuccessfully decoding machine-readable indicia; and
selecting the animation by retrieving one of the stored animation data sets in response to determining that the machine-readable indicia was successfully decoded or unsuccessfully decoded.

15. The method according to claim 14, further comprising enabling a user to select the data sets representative of the first and second animations from the memory.

16. The method according to claim 13, further comprising updating the animation being displayed according to a preset pattern of adjustments for at least one feature in the animation.

17. The method according to claim 13, further comprising displaying a third animation when a user is performing a scan, the third animation representing a scan mode so that the user knows that a scanning and/or decoding is being performed.

18. A barcode scanner system, comprising:
a camera configured to capture image data;
an electronic display configured to display information including graphics;
a housing including multiple surfaces, the electronic display extending along the multiple surfaces of the housing;
a memory; and
a processor in communication with the camera, memory, and electronic display,
the processor configured to:
receive image data from the camera;
process the image data;
detect a machine-readable indicia in the image data;
attempt to decode the machine-readable indicia; and
in response to successfully decoding the machine-readable indicia, display a first animation indicative of successfully decoding the machine-readable indicia,
otherwise, in response to not successfully decoding the machine-readable indicia, display a second animation indicative of not successfully decoding the machine-readable indicia,
continuously update the first animation or the second animation being displayed according to a preset pattern of adjustments for at least one feature in the animation; and
perform an augmented reality by displaying real-time images being captured by the camera with the machine-readable indicia displayed thereon along with the at least one feature displayed at the machine-readable indicia as the camera is capturing new real-time images and the position of the machine-readable indicia moves in the images.

19. The barcode scanner system according to claim 18, wherein the processor is further configured to display the first or second animation on the electronic display on at least two surfaces of the housing.

20. The barcode scanner system according to claim 18, wherein the electronic display includes a flexible display.

* * * * *